US011413751B2

(12) United States Patent
Keshmiri et al.

(10) Patent No.: US 11,413,751 B2
(45) Date of Patent: Aug. 16, 2022

(54) MOTION DISTRIBUTION IN ROBOTIC SYSTEMS

(71) Applicant: Hypertherm, Inc., Hanover, NH (US)

(72) Inventors: Mohammad Keshmiri, Longueuil (CA); Waseem Khan, Kirkland (CA); Korhan Turker, Montreal (CA)

(73) Assignee: Hypertherm, Inc., Hanover, NH (US)

( * ) Notice: Subject to any disclaimer, the term of this patent is extended or adjusted under 35 U.S.C. 154(b) by 257 days.

(21) Appl. No.: 16/787,418

(22) Filed: Feb. 11, 2020

(65) Prior Publication Data

US 2020/0254612 A1 Aug. 13, 2020

Related U.S. Application Data

(60) Provisional application No. 62/803,714, filed on Feb. 11, 2019.

(51) Int. Cl.
*B25J 9/16* (2006.01)
*B25J 9/02* (2006.01)
(Continued)

(52) U.S. Cl.
CPC ............ *B25J 9/1664* (2013.01); *B25J 9/023* (2013.01); *B25J 9/12* (2013.01); *B25J 9/161* (2013.01);
(Continued)

(58) Field of Classification Search
CPC ... B25J 9/1664; B25J 9/023; B25J 9/12; B25J 9/1607; B25J 9/161; B25J 15/0052; B25J 9/1682; B25J 9/1669; G05B 2219/39109
(Continued)

(56) References Cited

U.S. PATENT DOCUMENTS 5,243,266 A * 9/1993 Kasagami ............. B25J 9/1682
318/568.1
6,004,016 A 12/1999 Spector
(Continued)

FOREIGN PATENT DOCUMENTS

CN 102169347 8/2011
CN 109159127 1/2019
(Continued)

OTHER PUBLICATIONS

Connors,J.,etal., "Manipulating B-Spline Based Paths for Obstacle Avoidance in Autonomous Ground Vehicles," Ion NTM 2007, Jan. 22-24, 2007, San Diego, CA, 8 pages.
(Continued)

*Primary Examiner* — Jaime Figueroa
(74) *Attorney, Agent, or Firm* — Proskauer Rose LLP

(57) ABSTRACT

The present invention features a computer-implemented method for adjustably distributing cooperative motion between a first manipulator and a second manipulator in a manufacturing processing system. The method includes receiving, by a computing device, data for the first manipulator configured to hold a tool, data for the second manipulator configured to hold a workpiece, and process data defining a process to be performed by the tool on at least a portion of the workpiece. The data for at least one of the first or second manipulator comprises a weighting factor adjustable by a user to specify at least a percentage of motion for the corresponding manipulator. The method also includes generating a relative transformation function for defining the process path and distributing motions between the first and second manipulators to complete the process path based on the at least one weighting factor.

35 Claims, 24 Drawing Sheets

(51) Int. Cl.
*B25J 15/00* (2006.01)
*B25J 9/12* (2006.01)

(52) U.S. Cl.
CPC ......... *B25J 9/1607* (2013.01); *B25J 15/0052* (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 6,330,495 | B1* | 12/2001 | Kaneko | B25J 9/1671 |
| | | | | 700/248 |
| 6,392,190 | B1* | 5/2002 | Sue | B23K 9/287 |
| | | | | 427/446 |
| 6,397,123 | B1* | 5/2002 | Miyajima | G05B 19/408 |
| | | | | 700/89 |
| 6,566,835 | B1* | 5/2003 | Yoshida | G05B 19/404 |
| | | | | 318/632 |
| 6,678,582 | B2 | 1/2004 | Waled | |
| 6,757,613 | B2 | 6/2004 | Chapman et al. | |
| 7,734,358 | B2* | 6/2010 | Watanabe | G05B 19/425 |
| | | | | 700/61 |
| 8,170,716 | B2* | 5/2012 | Coste-Maniere | A61B 34/10 |
| | | | | 700/245 |
| 8,706,298 | B2* | 4/2014 | Goulding | G05D 1/0088 |
| | | | | 700/251 |
| 8,914,152 | B2 | 12/2014 | Scheurer et al. | |
| 9,104,197 | B2 | 8/2015 | Miegel et al. | |
| 9,221,175 | B2 | 12/2015 | Iwasaki | |
| 9,333,042 | B2* | 5/2016 | Diolaiti | A61B 34/72 |
| 9,387,589 | B2 | 7/2016 | Barajas et al. | |
| 9,390,203 | B2* | 7/2016 | Miegel | G06F 30/00 |
| 9,457,469 | B2 | 10/2016 | Hazan et al. | |
| 9,536,446 | B2* | 1/2017 | Vatcher | G09B 9/12 |
| 10,188,472 | B2* | 1/2019 | Diolaiti | A61B 34/72 |
| 10,239,206 | B2* | 3/2019 | Negishi | B25J 9/1692 |
| 2001/0004718 | A1* | 6/2001 | Gilliland | B25J 9/1671 |
| | | | | 700/255 |
| 2003/0205984 | A1* | 11/2003 | Yoshida | G05B 19/404 |
| | | | | 318/801 |
| 2004/0158356 | A1 | 8/2004 | Webb et al. | |
| 2005/0052460 | A1 | 3/2005 | Davignon | |
| 2005/0055132 | A1* | 3/2005 | Matsumoto | B25J 9/1682 |
| | | | | 700/245 |
| 2005/0071021 | A1 | 3/2005 | Weinhofer | |
| 2011/0231016 | A1* | 9/2011 | Goulding | G01C 21/20 |
| | | | | 700/246 |
| 2014/0302462 | A1* | 10/2014 | Vatcher | A63G 31/16 |
| | | | | 434/55 |
| 2015/0190926 | A1 | 7/2015 | Miegel et al. | |
| 2016/0297069 | A1* | 10/2016 | Negishi | B25J 9/1638 |
| 2016/0346853 | A1 | 12/2016 | Tuboguchi | |
| 2017/0334066 | A1* | 11/2017 | Levine | G06K 9/00 |
| 2018/0299874 | A1 | 10/2018 | Nobuhara | |
| 2019/0047149 | A1* | 2/2019 | Wouhaybi | B25J 9/1666 |
| 2019/0105779 | A1* | 4/2019 | Einav | B25J 9/1697 |
| 2019/0240833 | A1 | 8/2019 | Kimura | |

FOREIGN PATENT DOCUMENTS

| | | |
|---|---|---|
| CN | 109726853 | 5/2019 |
| DE | 102005060967 | 6/2007 |
| EP | 1642690 | 4/2006 |
| WO | 2015073322 | 5/2015 |
| WO | 2017001044 | 1/2017 |

OTHER PUBLICATIONS

Piazzi, A., et al., "G3-Splines for the Path Planning of Wheeled Mobile Robots," 2003 European Control Conference (ECC), Sep. 1-4, 2003, Cambridge, UK, 6 pages.

Quinlan, S., et al., "Elastic Bands: Connecting Path Planning and Control," Robotics Laboratory, Computer Science Department, Stanford University, 1993, 6 pages.

Severa, O., et al., "New 3D HMI tool for robot path planning based on latest W3C standards," Department of Cybernetics, University of West Bohemia in Pilsen, Pilsen, Czech Republic, 2012 6 pages.

Lewis, C.L., "Trajectory Generation For Two Robots Cooperating To Perform A Task" Proceedings of the 1996 IEEE, International Conference on Robotics and Automation, Minneapolis. Minnesota— Apr. 1999, pp. 1626-1631.

Ahmad et al., "Coordinated Motion Control of Multiple Robotic Devices for Welding and Redundancy Coordination through Constrained Optimization in Cartesian Space" School of Electrical Engineering at Purdue University, 1988, 6 pages.

Ali et al., "Offline Path Planning Of Cooperative Manipulators Using Co-evolutionary Genetic Algorithm", Department of Mechanical Engineering at Indian Institute of Technology, Madras, 2002, 10 pages.

Duelen et al., "CAD/CAM-unterstütztes Umrüsten Von Produktionsanlagen," ZWF Zeitschrift Fur Wirtschaftliche Fertigung und Automatisierung, Carl Hanser Verlag, Munich, Germany, vol. 86, No. 8, Aug. 1, 1991, 11 pages. CAD/CAM-assisted retrofitting of production facilities, ZWF magazine for economic production and automation, v. 86 #8 (Aug. 1, 1991), pp. 381-386. Machine Translation attached at the end of the paper.

Jo et al., "Virtual testing of agile manufacturing software using 3D graphical simulation," Robotics and Automation., 1997 Proceedings IEEE International Conference in Albuquerque, NM, Apr. 20-25, 1997; IEEE, New York, NY, vol. 2, Apr. 20, 1997, 6 pages.

Freund et al., "Systems Approach to Robotics and Automation," Proceedings of the International Conference on Robotics and Automation, Nagoya, Japan, May 21-27, 1995, IEEE, New York, vol. 1, May 21, 1995, 12 pages.

\* cited by examiner

MOTION DISTRIBUTION IN ROBOTIC SYSTEMS

CROSS REFERENCE TO RELATED APPLICATION

This application claims the benefit of and priority to U.S. Provisional Patent Application No. 62/803,714 filed Feb. 11, 2019, the entire content of which is owned by the assignee of the instant application and incorporated herein by reference in its entirety.

TECHNICAL FIELD

The present invention generally relates to computer-implemented systems and methods for adjustably distributing cooperative motion between robotic manipulators in a manufacturing processing system.

BACKGROUND

Robotic path planning is used in a variety of industries to improve throughput. For example, in a manufacturing processing facility, a robotic system can be used to automate processing (e.g., heating, cutting, gouging and marking) of workpieces by one or more thermal processing torches (e.g., plasma arc torches) or cutting tools. Specifically, the manufacturing facility can include a computer numeric controller (CNC) used by an operator to input information specifying various operating parameters. The CNC can be in electrical communication with one or more robots or a combination of separate axes (e.g., rails and rotaries) of the manufacturing processing facility, which are hereinafter generally referred to as manipulators. In general, a robot manipulator has six degrees of freedom in terms of movement, whereas a rail or rotary manipulator has one degree of freedom.

In an exemplary setup, one manipulator can be programmed via the CNC to perform a processing operation on a workpiece that is located on the ground or on a fixture. In this case, the manipulator carries a tooling on its end-effectors with a tool mounted on the tooling. The manipulator's joints can be actuated by the CNC in such a way that the tool follows a planned path relative to the stationery workpiece. If the processing is complex, the manipulator holding the tool may need to work around the workpiece, or if the workpiece is large, the manipulator may need to work close to its workspace boundaries. Thus, in a manufacturing processing environment, a setup with more than one manipulator is usually utilized to perform complex and/or large-scale tasks. In such large-scale systems, one manipulator can be configured to hold a workpiece (hereinafter referred to as the holder manipulator) and another manipulator can be configured to hold a tool to process the workpiece (hereinafter referred as the worker manipulator). The CNC can be in electrical communication with both the holder and worker manipulators to automate the processing of the workpiece by the tool along a planned path. However, resolving motion redundancies between the two manipulators is challenging, which can occur when a manipulator has more degrees of freedom than those required to execute a given task. Specifically, a given task may have six degrees of freedom in space, which include three linear and three rotational freedom. However, when a processing system include two or more manipulators, there are more than six degrees of freedom. Hence, there are more than one way to perform the given task in some or all of the task's degrees of freedom. For example if the task is mounted on a rail manipulator, which provides a linear degree of freedom, and the task is processed by a robot manipulator which has six degrees of freedom, The task can be completed in more than one way in the direction of the degree of freedom that the rail manipulator provides. This extra degree of freedom is called the redundancy of the system. As another example, the system includes two robot manipulators with one holding a workpiece and the other one holding a tool to process the workpiece. Since each robot manipulator offers six degrees of freedom to the system, the system has twelve degrees of freedom and six degrees of redundancy in the task space.

Therefore, introducing the holder manipulator in addition to the worker manipulator generates a motion redundancy in some or all degrees of freedom of the task space. As an example, a workpiece can be mounted on a holder manipulator comprising a rail, where the holder manipulator is configured to move along the x-axis of the user frame, which is a frame relative to which all measurements in a task space are taken. The worker manipulator can also move the tool along the x-axis of the user frame. Therefore, any part of the planned path that originally requires the worker manipulator to move in the x direction now can also and/or instead be done by moving the holder manipulator in the x direction, opposite to that of the worker manipulator. Thus, the motions along the x axis to complete the planned path can be completed by the holder manipulator alone, the worker manipulator alone, or both the worker and holder manipulators in a shared manner. As another example, instead of the holder manipulator being a rail, it is robot. Such setup creates redundancies in all six degrees of freedom of the task space. These redundancies can be used to reduce/optimize some criteria such as manipulator joint travel, robot write twist, the risk of collision, etc.

There have been some efforts in solving the problem of handling redundant degrees of freedom in a robotic system. However, current approaches and methodologies have several flaws and inefficiencies. Currently, the motion of redundant degrees of freedom is typically determined using a continuous optimization problem where a cost function (e.g., joint motion) is attempted to be minimized. This methodology can be comprehensive by including collision constraints within the environment and solving for a minimum time solution. However, such methodologies are prone to be stuck in local minima and are nondeterministic-polynomial-time (NP)-hard problems for which the time to generate a solution is not reliable and often quite long. Processor usage for solving these NP-hard problems can be intensive. Moreover, these methodologies are mostly academic and do not take into account practical end user concerns and/or desires in a real manufacturing environment.

SUMMARY

The present invention features systems and methods for distributing a processing operation, such as plasma arc cutting, painting, spray coating, riveting, etc. between two manipulators based on user inputs. Specifically, the systems and methods of the present invention resolve a redundant setup of task performance between a pair of manipulators by distributing motions between them and potentially improving joint motions of the manipulators.

The present invention, in one aspect, features a computer-implemented method for adjustably distributing cooperative motion between a first manipulator and a second manipulator in a manufacturing processing system. The computer-implemented method includes receiving, by a computing device, data for the first manipulator configured to hold a tool, data for the second manipulator configured to hold a workpiece, and process data defining a process to be performed by the tool on at least a portion of the workpiece. The data for at least one of the first or second manipulator comprises a weighting factor adjustable by a user to specify at least a percentage of motion for the corresponding manipulator. The method includes calculating, by the computing device, a first point and a next point of a process path by the tool over the workpiece using the process data. The method also includes generating, by the computing device, a relative transformation function for defining the process path from the first point to the next point. The method further includes distributing, by the computing device, motions between the first and second manipulators to complete the process path based on the at least one weighting factor.

In another aspect, the invention features a computer-implemented method for adjustably distributing cooperative motion between a first manipulator and a second manipulator in a manufacturing processing system. The computer-implemented method comprises receiving, by a computing device, data for the first manipulator configured to hold a tool, data for the second manipulator configured to hold a workpiece, and process data defining a process to be performed by the tool on at least a portion of the workpiece. The data for at least one of the first or second manipulator comprises a weighting factor adjustable by a user to specify at least one percentage of motion to be performed by the corresponding manipulator. The method includes calculating, by the computing device, a first point and a next point of a process path by the tool over the workpiece using the process data, and generating, by the computing device, a relative transformation function for defining the process path from the first point to the next point. The relative transformation function comprising a translation portion and a rotation portion. The method also includes distributing, by the computing device, the translation portion of the relative transformation function between the first and second manipulators based on the weighting factor to generate distributed translation motions for the first and second manipulators. The method further includes distributing, by the computing device, the rotational portion of the relative transformation function between the first and second manipulators based on the weighting factor to generate distributed rotation motions for the first and second manipulators.

In yet another aspect, the invention features a computer system configured to allow a user to adjustably distribute cooperative motion between a first manipulator and a second manipulator in a manufacturing processing system. The computer system comprises a data connection and graphical user interface configured to receive from the user (i) data for the first manipulator configured to hold a tool, (ii) data for the second manipulator configured to hold a workpiece, and (iii) process data defining a process to be performed by the tool on at least a portion of the workpiece. The data for at least one of the first or second manipulator comprises a weighting factor adjustable by the user from the interface to specify at least a percentage of motion for the corresponding manipulator. The computer system also includes a computation module configured to (i) calculate a first point and a next point of a process path by the tool over the workpiece using the process data, (ii) generate a relative transformation function for defining the process path from the first point to the next point, and (iii) distribute motions between the first and second manipulators to complete the process path based on the at least one weighting factor. The computer system further includes a display module configured to graphically illustrate the distributed motions for respective ones of the first and second manipulators for visualizing processing of the workpiece held by the second manipulator by the tool held by the first manipulator.

In yet another aspect, the present invention features a computer program product, tangibly embodied in a non-transitory computer readable storage device, for adjustably distributing cooperative motion between a first manipulator and a second manipulator in a manufacturing processing system. The computer program product including instructions operable to cause a computing device to receive data for the first manipulator configured to hold a tool, data for the second manipulator configured to hold a workpiece, and process data defining a process to be performed by the tool on at least a portion of the workpiece. The data for at least one of the first or second manipulator comprises a weighting factor adjustable by a user to specify at least a percentage of motion for the corresponding manipulator. The computer program product also includes instructions operable to cause a computing device to calculate a first point and a next point of a process path by the tool over the workpiece using the process data and generate a relative transformation function for defining the process path from the first point to the next point. The computer program product further includes instructions operable to cause a computing device to distribute motions between the first and second manipulators to complete the process path based on the at least one weighting factor.

Any of the above aspects can include one or more of the following features. In some embodiments, the first and second manipulators are actuated in accordance with the calculated motions for the respective manipulators.

In some embodiments, the relative transformation function comprises at least one of a translation portion and a rotation portion that define the process path. In some embodiments, distributing motions between the first and second manipulators comprises distributing each of the translation portion and the rotation portion between the first and second manipulators in accordance with the weighting factor.

In some embodiments, distributing the translation portion between the first and second manipulators comprises (i) defining a weight vector based on the weighting factor, where the weight vector representing a relative motion in each of X, Y and Z directions for the manipulator corresponding to the weighting factor, (ii) element-wise multiplying the weight vector with the translation portion to generate a distributed translation motion for the corresponding manipulator, and (iii) generating a distributed translation motion for the other manipulator based on the distributed translation motion for the corresponding manipulator.

In some embodiments, the weighting factor includes a single weight for controlling complete rotation for the manipulator corresponding to the weighting factor. In some embodiments, distributing the rotation portion between the first and second manipulators comprises (i) generating a rotation matrix based on the single weight, (ii) converting the rotation matrix to an invariant vector that is represented by a vector of rotation and an angle of rotation, and (iii) distributing the angle of rotation between the first and second manipulators based on the single weight to generate distributed rotation motions for the first and second manipulators.

In some embodiments, the weighting factor comprises multiple weights for controlling rotation in multiple axes for the manipulator corresponding to the weighting factor. The multiple axes can include a user-selected main axis, a tool axis and a third axis normal to both the main and tool axes. In some embodiments, distributing the rotation portion between the first and second manipulators comprises (i) determining a main axis, a tool axis and a third axis that is normal to both the main axis and the tool axis, and (ii) for each of the main, tool and third axes, calculating distributed rotation motions between the first and second manipulators based on the weight corresponding to the respective axis.

In some embodiments, the weighting factor comprises a plurality of user-selected percentages for controlling distributions for translation and rotation along the process path. In some embodiments, the plurality of percentages comprise three percentages for controlling corresponding translational distributions along x, y and z axes. Alternatively, the plurality of percentages comprise a single percentage for controlling translational distributions along x, y and z axes. In some embodiments, the plurality of percentages comprise three percentages for controlling corresponding rotational distributions along a user-selected main axis, a tool axis, and a third axis normal to both the main and tool axes. Alternatively, the plurality of percentages comprise a single percentage for controlling rotational distributions along all three of a user-selected main axis, a tool axis, and a third axis normal to both the main and tool axes. In some embodiments, the weighting factor comprises a single user-selected percentage for controlling distributions for both translation and rotation along the process path.

In some embodiments, the calculated motions for the first and second manipulators ensure minimal movements of the tool and the workpiece in the task space. In some embodiments, the distributed translation and rotation motions for respective ones of the first and second manipulators are displayed to visualize processing of the workpiece by the tool.

In some embodiments, the weighting factor relates to the percentage of motion for one of the first or second manipulator and wherein the computer device is adapted to compute a percentage of motion for the other manipulator based on the weight factor.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 19-22 show exemplary interfaces through which a user specifies a weighting factor for the holder manipulator of the system setup of FIG. 18, according to some embodiments of the present invention.

FIGS. 24 and 25 show exemplary interfaces through which a user specifies a weighting factor for the holder manipulator of the system setup of FIG. 23, according to some embodiments of the present invention.

FIGS. 27-29 show exemplary interfaces through which a user specifies a weighting factor for the holder manipulator of the system setup of FIG. 26, according to some embodiments of the present invention.

DETAILED DESCRIPTION

Figure 1:
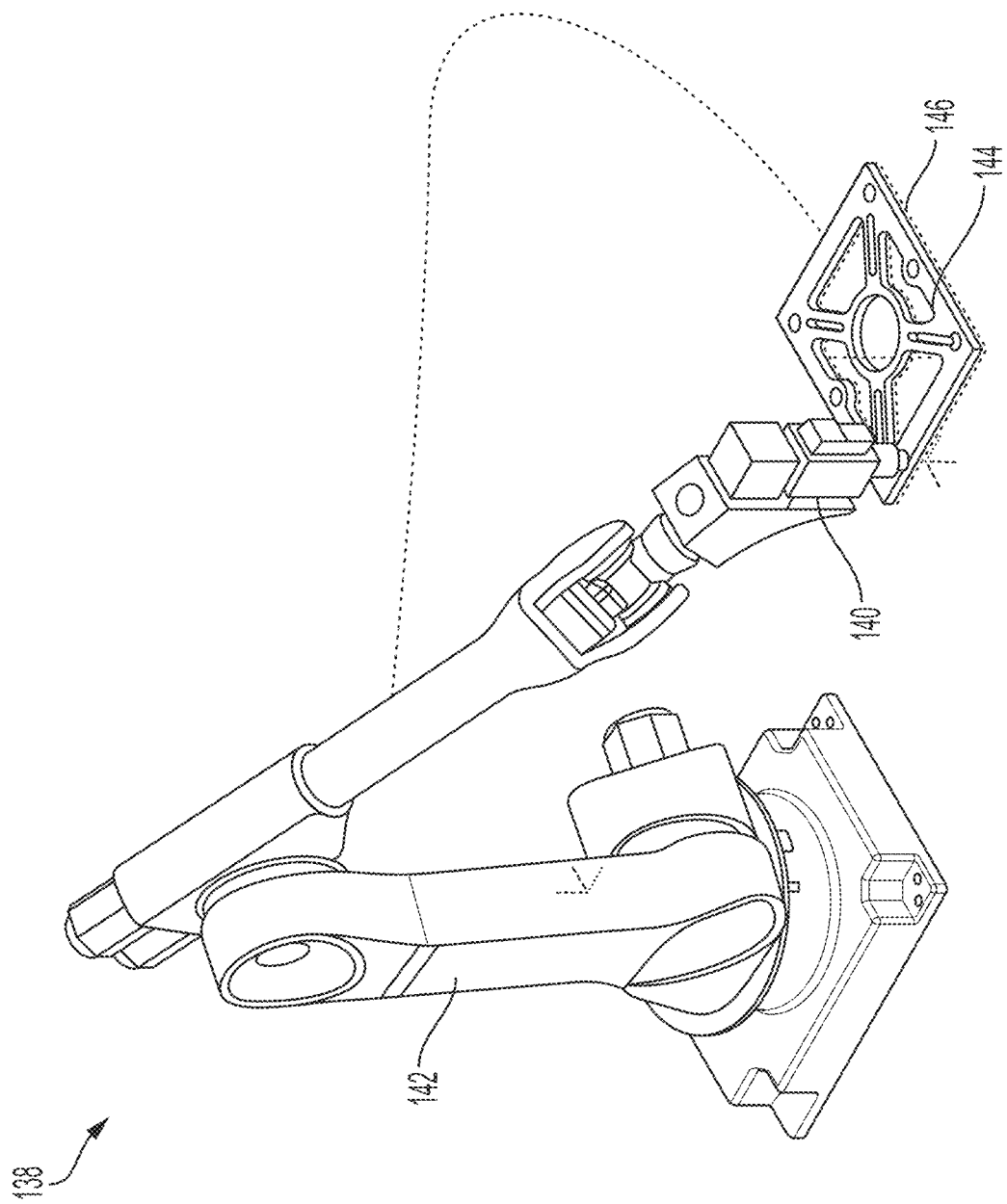
FIG. 1 shows an exemplary virtual environment of a robotic manufacturing processing system within which a tool mounted on a worker manipulator processes a workpiece along a process path, according to some embodiments of the present invention.
Figure 18:
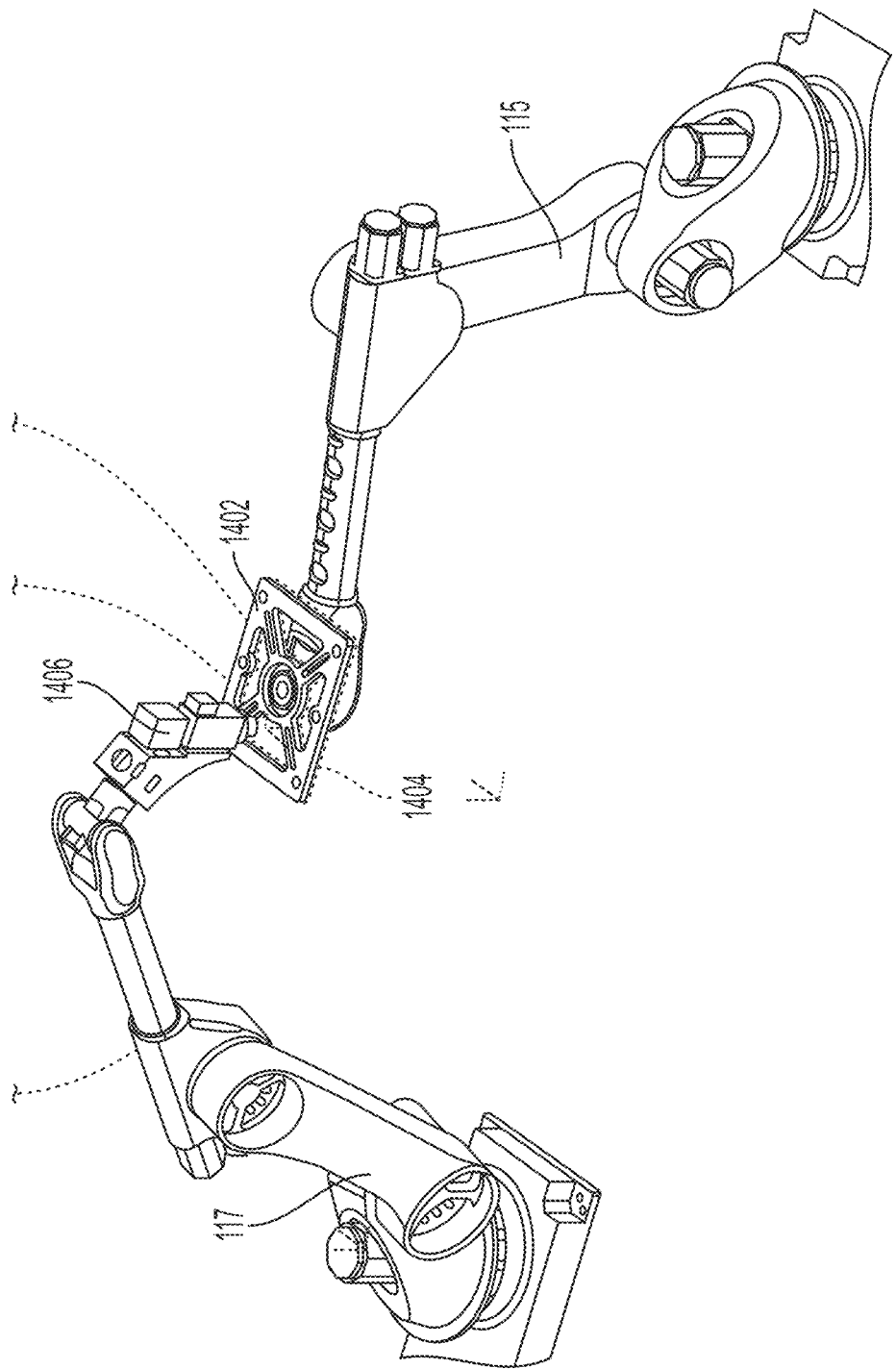
FIG. 18 shows an exemplary system setup for implementing the motion distribution approach of FIG. 3, according to some embodiments of the present invention.

FIG. 1 shows an exemplary virtual environment 138 of a robotic manufacturing processing system within which a tool 140 mounted on a worker manipulator 142 processes a workpiece 144 along a process path 146, according to some embodiments of the present invention. The workpiece 144 can be held by a robot holder manipulator (not shown in FIG. 1, but similar to the robot holder manipulator of FIG. 18) that adds six degrees of freedom/redundancy of movement to the task space or a rail/rotary (not shown in FIG. 1, but similar to the rotary holder manipulator of FIGS. 10a-c) that adds one degree of freedom/redundancy of movement to the task space. In general, to move the tool 140 along the process path 146, which is along the side of the workpiece 144 as illustrated, there is an infinite number of possibilities. One possibility is that the workpiece 144 is stationery and the worker manipulator 142 moves the tool 140 along the process path 146. Another possibility, as shown in FIG. 18, is that the worker manipulator 117 (along with the tool 1406) is stationary and the holder manipulator 115 moves the workpiece 1402 in the opposite direction in comparison to the direction of the tool 1406. Other possibilities include sharing the motion from the start to the end of the process path 1404 between the holder and worker manipulators 115, 117. For example, if the total distance to be covered by the process path 1404 is 100 cm, the worker manipulator 117 can move the tool 1406 by 30 cm and the holder manipulator 115 can move the workpiece 1402 by 70 cm in the opposite direction, thereby achieving 100 cm of distance covered. Therefore, the percentage of motion distribution for the worker manipulator 117 for completing the task is 30% and the percentage of motion distribution for the holder manipulator 115 is 70%. This concept can be generalized to all possible degrees of freedom (rotationally and/or translationally) for each of the worker and holder manipulators. In general, the present invention analyzes, controls and designs distributed motions in a redundant motion system based on user inputs. In some embodiments, for a given processing task, the present invention allows a user to set the percentage(s) of motion distribution for each of the worker and holder manipulators along one or more possible degrees of movement for completing the task. The present invention is able to determine distributed motions for both the worker and holder manipulators to complete the processing task while satisfying the percentage(s) of motion distribution criteria set by the user.

Figure 2:
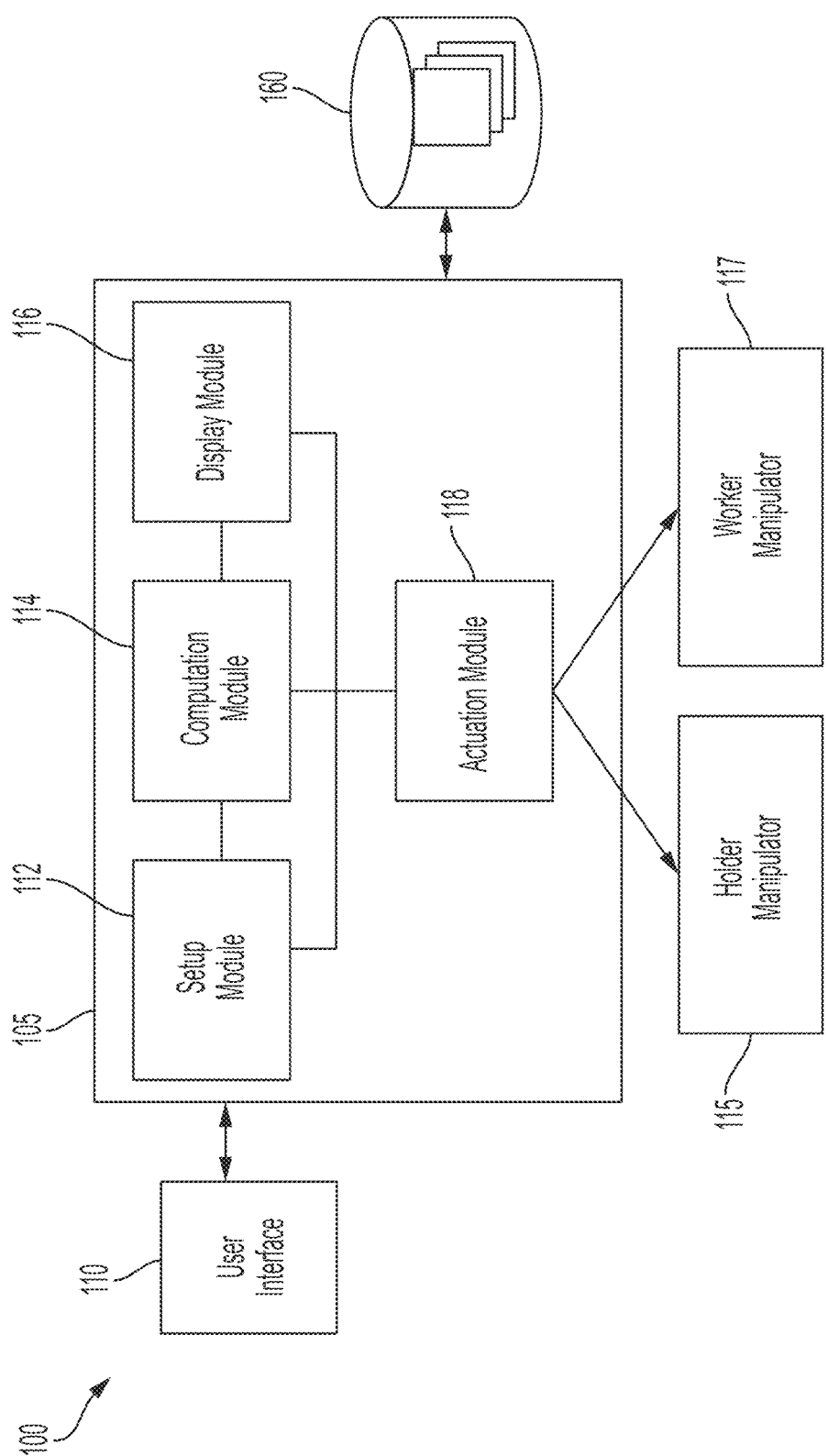
FIG. 2 shows a block diagram of an exemplary robotic manufacturing processing system, according to some embodiments of the present invention.

FIG. 2 shows a block diagram of an exemplary robotic manufacturing processing system 100 that includes a motion distribution processor 105, a user interface 110 and a pair of robotic manipulators comprising a holder manipulator 115 configured to hold a workpiece and a worker manipulator 117 configured to process the workpiece in a user-defined process, according to some embodiments of the present invention. The user interface 110 can include a computer keyboard, mouse, a graphical user interface (e.g., a computerized display), other haptic interfaces, voice input, or other input/output channels for a user to communicate with the motion distribution processor 105. In some embodiments, the graphical user interface of the user interface 110 is configured to visualize in a three-dimensional virtual environment motions calculated by the processor 105 for the respective ones of the manipulators 115, 117 for completing a user-defined process. The motion distribution processor 105 is coupled to the manipulators 115, 117 to automate or otherwise direct the manipulators 115, 117 to follow the calculated motions for the purpose of processing (e.g., cutting) the workpiece held by the holder manipulator 115 using a tool (e.g., a plasma arc torch) mounted on the worker manipulator 117.

As shown in FIG. 2, the processor 105 generally includes a setup module 112, a computation module 114, a display module 116 and an optional actuation module 118. The modules 112-118 can be implemented in hardware only or in a combination of hardware and software to execute the distribution motion determination described below. In particular, the setup module 112 is configured to receive and process data from a user via the user interface 110, including (i) data for the holder manipulator 115, (ii) data for the worker manipulator 117, and (iii) data defining a process to be performed by the tool mounted on the worker manipulator 117 on at least a portion of the workpiece held by the holder manipulator 115. In some embodiments, the data for the holder manipulator 115 and/or the data for the worker manipulator 117 includes a weighting factor adjustable by the user via the interface 110 to specify at least a percentage of motion distribution for the corresponding manipulator, which is used by the processor 105 to determine the distributed motions between the two manipulators, as described in detail below. In general, the data provided to the user interface 110 and/or processed by the setup module 112 can be in the form of any suitable data structures, such as textual lists, XML documents, class objects (e.g., instances of C++ or Java classes), other data structures, or any combination thereof.

The computation module 114 is configured to calculate and assign distributed motions between the holder and worker manipulators 115, 117 to complete a processing task based on the parameters received by the setup module 112, which is described in detail below. The display module 116 is configured to interact with the graphical user interface 110 to visualize the distributed motions of the manipulators (calculated by the computation module 114) in a virtual simulation of the robotic manufacturing processing system 110. The display module 116 can visually illustrate how the tool mounted on the worker manipulator 117 processes the workpiece held by the holder manipulator 115 while complying with the user-defined parameters and constraints. Such a display encourages user interaction with the processor 105 to change and/or refine the parameters for motion distribution. The optional actuation module 118, in electrical communication with the computation module 114, can actuate the manipulators 115, 117 to follow the motions calculated by the computation module 114 when completing their respective tasks (e.g., cutting for the worker manipulator 117 and workpiece holding for the holder manipulator 115). In general, the optional actuation module 118 can communicate with any one of the modules 112-116 to obtain the pertinent information for moving the manipulators 115, 117.

The system 100 further includes a memory 160 that is configured to communicate with one or more of the modules 112-118 of the processor 105. For example, the memory 160 can be used to store data processed by the setup module 112, one or more functions and values used by the computation module 114 to calculate the distributed manipulator motions, and/or instructions formulated by the optional actuation module 118 to direct the movement of the manipulators 115, 117.

In some embodiments, the processor 105 is a stand-alone system that is separate from the holder and worker manipulators 115, 117. For example, the processor 105 can be a vendor-side component configured to transmit instructions to the client system to control the movement of the holder and worker manipulators 115, 117 of the client system. Even though the actuation module 118 is illustrated as a part of the processor 105, in some embodiments, it is absent from the processor 105 and/or remote from the processor 105, such as on the client system.

Figure 3:
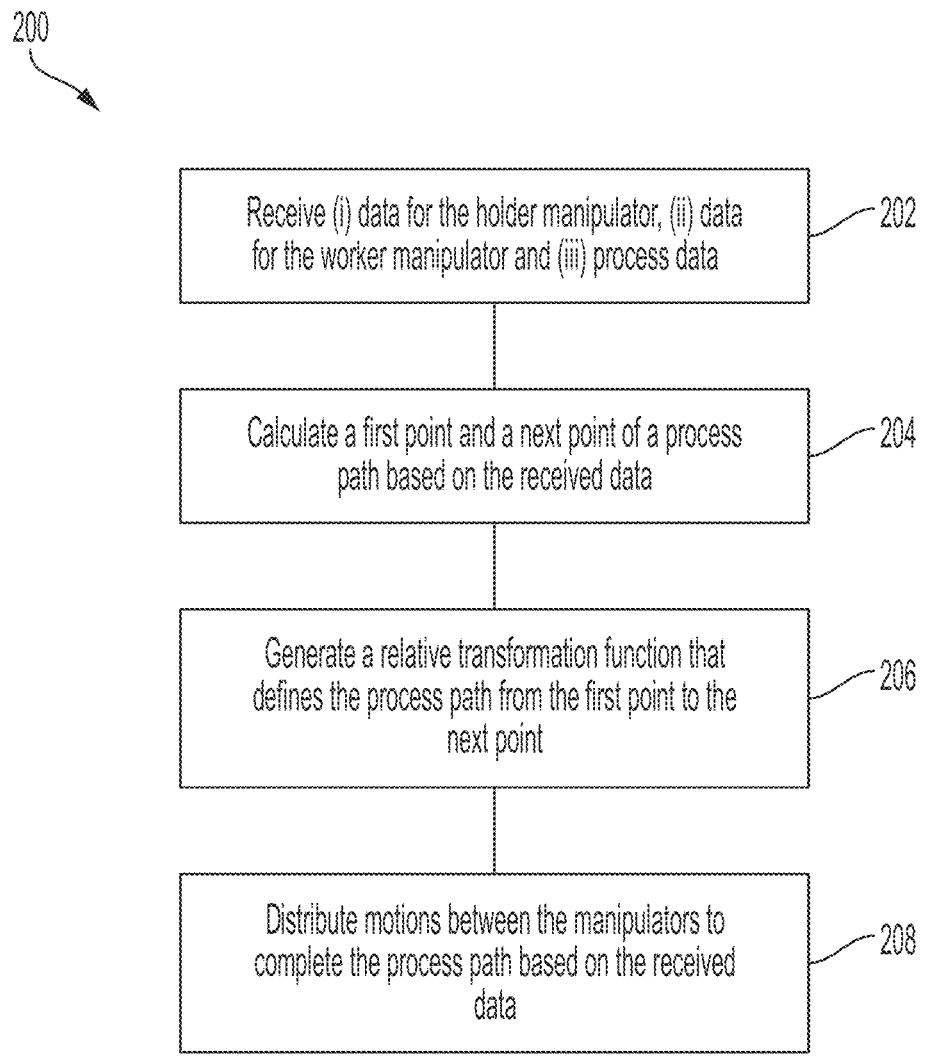
FIG. 3 shows a flow diagram of an exemplary approach for computing distributed cooperative motions between the worker and holder manipulators of the robotic manufacturing processing system of FIG. 2, according to some embodiments of the present invention.

FIG. 3 shows the flow diagram of an exemplary approach 200 for computing distributed cooperative motions between the worker and holder manipulators 115, 117 of the robotic manufacturing processing system 100 of FIG. 2, according to some embodiments of the present invention. As shown in FIG. 3, generating distributed motions can include receiving data related to the holder and worker manipulators 115, 117, along with data defining a process to be performed by the tool mounted on the worker manipulator 117 on at least a portion of the workpiece held by the holder manipulator 115, the process data including user-defined motion distributions between the worker and holder manipulators (step 202), calculating a first point and a next point of a process path using the received data (step 204), generating a relative transformation function that defines the process path from the first point to the next point (step 206), and distributing motions between the pair of manipulators 115, 117 to complete the process path based on parameters/constraints specified by the user at step 202 (step 208). In some embodiments, steps 204, 206 and 208 are repeated for every pair of consecutive process points along the process path until the entire process path is distributed. Optionally, the approach 200 can further include actuating or cause to actuate the manipulators 115, 117 to substantially follow the respective distributed motions calculated at step 208 (not shown).

At step 202, the setup module 112 of the processor 105 is configured to process the data needed to compute the distributed motions between the holder and worker manipulators 115, 117, where at least a portion of the data (e.g., the distribution percentages of total motion) is received from a user via the user interface 110. The data can include information related to the worker manipulator 117, information related to the holder manipulator 115, and information that defines the process/task to be performed by the two manipulators. In some embodiments, the data for at least one of the holder or worker manipulator includes a weighting factor that is adjustable by the user via the user interface 110 to specify one or more percentages of motion for the corresponding manipulator relative to the cooperative motions. Other manipulator data for each of the manipulators 115, 117 includes the kinematic information of the manipulator, which comprises dimensions of the manipulator links and joint vector for each axis of the manipulator. The placement of the manipulator in the robotic cell can also be included in the manipulator data. Additional manipulator data can include the axis configuration of the manipulator (e.g., the sixth degree of freedom of the tool), the configuration of the manipulator, etc. The data for the processing task can include the relative position of the path points with respect to the workpiece, the motion type of the manipulators for each path point, such as joint motion, linear motion and/or circular motion. In general, the data used by the processor 105 can be provided by one or more sources, such as by a user via the interface 110, from another computing system (e.g., a process path creator software), or a combination of both.

Figure 4:
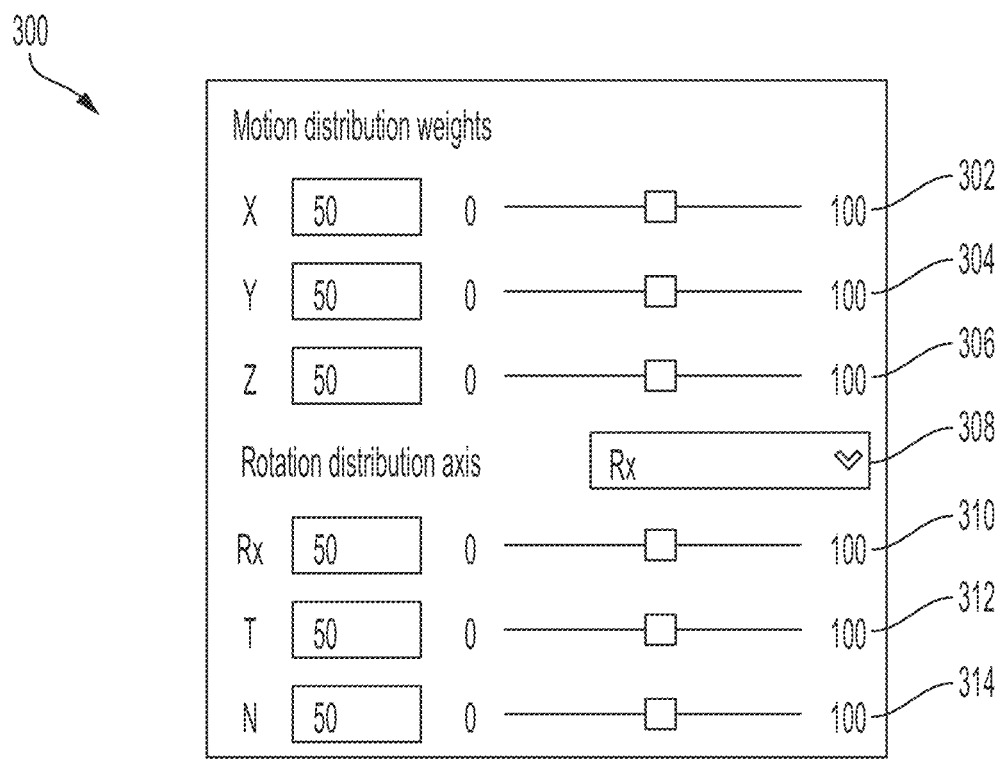
FIG. 4 shows an example of the user interface of FIG. 2 that allows a user to set a weighting factor for the holder or worker manipulator, according to some embodiments of the present invention.

FIG. 4 shows an example 300 of the user interface 110 of FIG. 2 that allows a user to set a weighting factor for the holder or worker manipulator 115, 117, according to some embodiments of the present invention. In general, each manipulator can have six degrees of freedom if the manipulator is a robot, and one degree of freedom if the manipulator is a rail or rotary. A set of two or three rails or rotaries can also be used to create a two- or three- degree-of-freedom manipulator. The six degrees of freedom associated with a robot manipulator includes three degrees defining a translation motion and three degrees defining a rotation motion. Thus, a weighting factor for each manipulator can include one to six user-definable weights (e.g., percentages of motion distribution) for controlling translation and rotation motions of a manipulator along a processing path for completing a processing task.

In some embodiments, only one interactive interface for one of the manipulators (e.g., the worker manipulator 117) is presented to the user for setting the percentage(s) of distribution of the weighting factor associated with that manipulator. The percentage(s) of distribution for the other manipulator (e.g., the holder manipulator 115) are calculated by the computation module 114 based on the percentages specified by the user for the first manipulator, such as by subtracting each user-selected percentage of distribution with respect to a dimension from 100% to determine the percentage of distribution for the other manipulator with respect to the same dimension (the two manipulators to accomplish 100% to complete processing). In some embodiments, the interface 300 is for a default manipulator predefined by the system 100. In some embodiments, the user is able to choose one of the holder manipulator 115 or the worker manipulator 117 to define the weighting factor. In some embodiments, the user is able to define the weighting factors for both of the holder and worker manipulators 115, 117.

As shown in FIG. 4, the interactive interface 300 includes six user-selectable features 302, 304, 306, 310, 312, 314 for specifying the percentages of distribution in six degrees of freedom for a weighting factor of a robot manipulator. Specifically, features 302, 304 and 306 are sliders and/or text boxes that let the user specify the percentages of distribution of a translation motion of the manipulator with respect to each of the x-axis, y-axis and z-axis, respectively, for completing a particular processing task. For the rotation motion, to distribute rotation about three different axes, the interactive interface 300 includes an input box 308 (e.g., in the form of a dropdown box) that allows the user to first select one of the x-axis, y-axis or z-axis as the main axis of rotation. As shown in FIG. 4, the user has chosen the x-axis as the main rotational axis, which is denoted as $R_x$. The other two axes can be determined by the computation module 114, which include (i) a tool axis that defines the direction of the tool mounted on the worker manipulator 117 (e.g., the direction of the nozzle of a plasma arc torch mounted on the worker manipulator 117), hereinafter referred to as the T axis, and (ii) a third axis that is normal to both the main and tool axes, hereinafter referred to as the N axis. A user can define the percentages of distribution of a rotational motion with respect to each of the $R_x$, T and N axes for the manipulator associated with the interface 300. For example, features 310, 312 and 314 can be sliders and/or text boxes that let the user set the percentages of distribution about the $R_x$-axis, T-axis and N-axis, respective, for a rotation motion of the manipulator. In some embodiments, the percentages of distribution for the other manipulator are calculated by subtracting from 100% the corresponding percentages of distribution for the manipulator associated with the interface 300.

Figure 5:
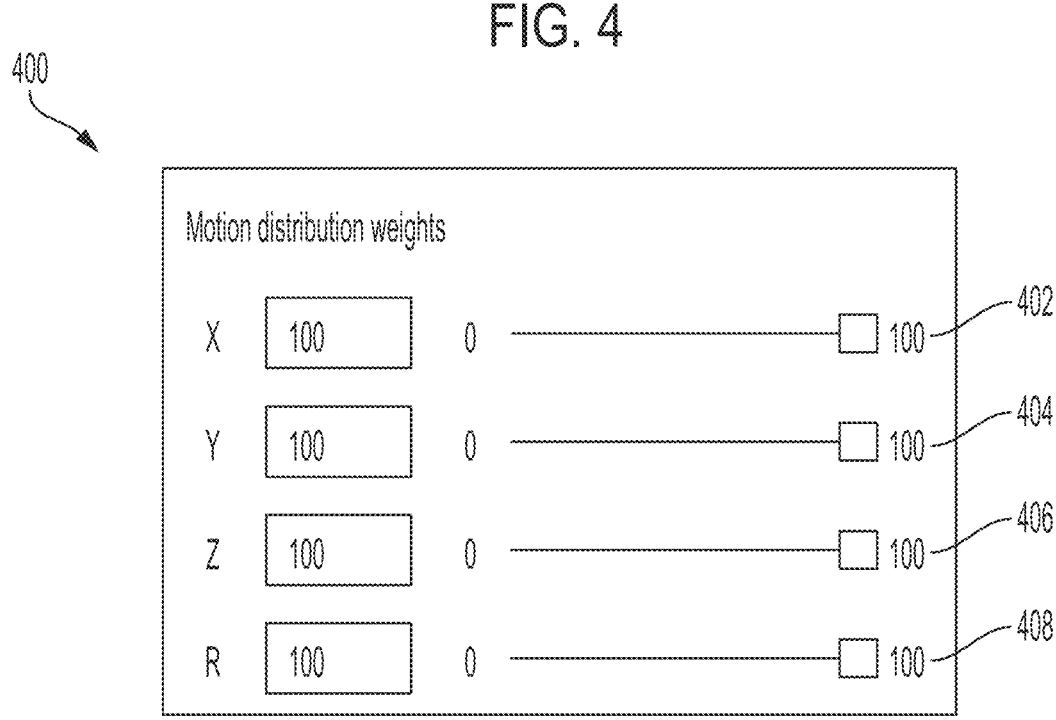
FIG. 5 shows another example of the user interface of FIG. 2 that allows a user to set a weighting factor for the holder or worker manipulator, according to some embodiments of the present invention.

FIG. 5 shows another example 400 of the user interface 110 of FIG. 2 that allows a user to set a weighting factor for the holder or worker manipulator 115, 117, according to some embodiments of the present invention. Similar to the interface 300 of FIG. 4, features 402, 404 and 406 can be sliders and/or text boxes that let the user specify the percentages of distribution of a translation motion of the manipulator corresponding to the interface 400 with respect to each of the three x-axis, y-axis and z-axis, respectively, for completing a particular processing task. For the rotation motion, the interface 400 at feature 408 allows the user to specify a single percentage of distribution that controls the complete rotation distribution of the corresponding manipulator, thereby making the interface and parameter selection process easier for the user who may not be as experienced/knowledgeable as the user of the interface 400 of FIG. 4.

Figure 6:
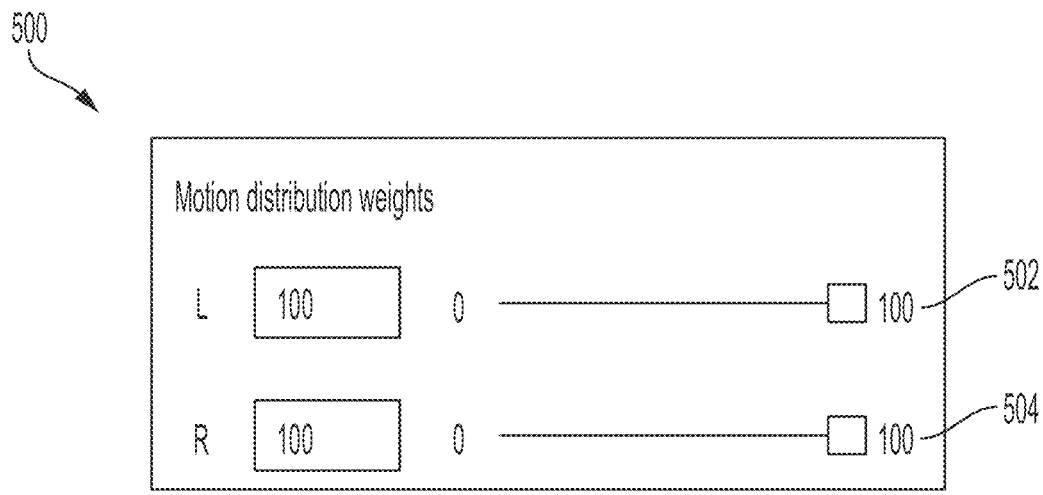
FIG. 6 shows yet another example of the user interface of FIG. 2 that allows a user to set a weighting factor for the holder or worker manipulator, according to some embodiments of the present invention.

FIG. 6 shows yet another example 500 of the user interface 110 of FIG. 2 that allows a user to set a weighting factor for the holder or worker manipulator 115, 117, according to some embodiments of the present invention. As shown, the interface 500 allows the user to specify a single percentage of distribution 502 that controls translation distribution of the manipulator corresponding to the interface 500 in all three of the x-axis, y-axis and z-axis for completing a particular processing task. Thus, the same percentage of distribution 502 is assigned to all three of the x, y and z axes. Similar to the interface 400 of FIG. 5, the user is also able to specify a single percentage of distribution 504 that controls the complete rotation distribution of the corresponding manipulator. The user interface of FIG. 6 thus offers an even simpler parameter selection process than those offered by the interfaces 300 and 400.

In yet another embodiment of the user interface 110, the interface (not show) allows a user to select a weighting factor for a holder or worker manipulator 115, 117 by setting a single percentage of distribution for controlling both translation and rotation distributions of the corresponding manipulator. That is, the same percentage of distribution is assigned to all six degrees of freedom for that manipulator. Thus, the translation and rotation distributions of the other manipulator is also controlled by a single percentage of distribution.

Figure 7:
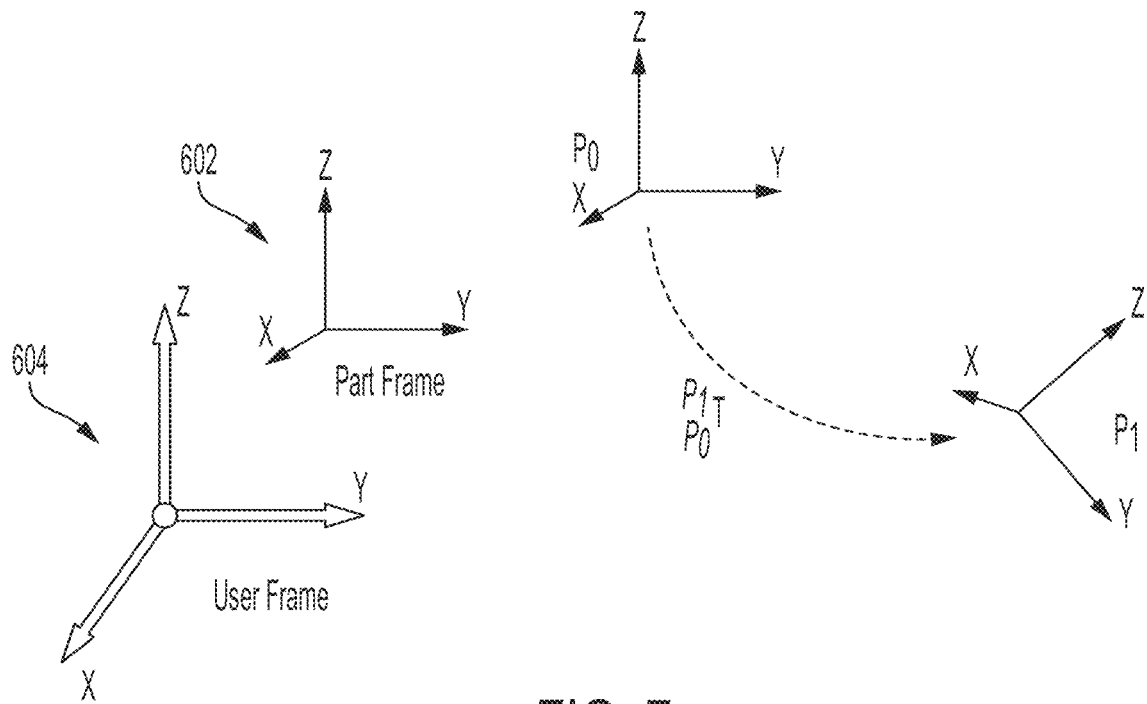
FIG. 7 graphically illustrates an exemplary relative transformation function of the approach of FIG. 3 that represents motion of a manipulator between a first point $P_0$ and a next point $P_1$, according to some embodiments of the present invention.

Referring back to the approach 200 of FIG. 3, based on the user input at step 202 (including user input that describes the desired processing task), the computation module 114 is configured to determine a first point ($P_0$) and a next point ($P_1$) of a process path at step 204, where the process path represents the overall collective motion for completing the task At step 206, the computation module 114 is configured to capture the process path in the three-dimensional task space. A process path is constructed from a finite number of process points, where data for each point includes the position and orientation data of that point with respect to a part frame 602 (as shown in FIG. 7). At each step of the computation, the computation module 114 determines two consecutive points starting from the beginning of the process path, where the first point is hereinafter referred to as $P_0$ and the next point is hereinafter referred to as $P_1$, and a relative transformation function T is computed between them.] FIG. 7 graphically illustrates an exemplary relative transformation function T that represents motion of a manipulator between a first point $P_0$ and a next point $P_1$, according to some embodiments of the present invention. In some embodiments, the relative transformation function T between these two points is computed by multiplying the inverse transformation function of the next point $P_1$ relative to a user frame 604 and the transformation function of the first point $P_0$ relative to the user frame 604. The embodiment of FIG. 7 assumes that a single manipulator (e.g., the worker manipulator 117 with a tool mounted thereon) is configured to move along the entire process path between the first and next points to perform the task while the other manipulator remains stationary. This means that the mobile manipulator needs to transform/move by $_{P_0}^{P_1}T$ from the first point $P_0$ to reach the next point $P_1$, as illustrated in FIG. 7

In some embodiments, it is assumed that the relative pose of the workpiece held by the holder manipulator 115 with respect to the tool mounted on the worker manipulator 117 remains the same along each point on the process path regardless of the distributive motions of the two manipulators 115, 117. This means that if in the case where the worker manipulator 117 performs all the processing task, the relative transformation of the holder manipulator 115 holding the workpiece with respect to the tool of the worker manipulator 117 at the next point ($P_1$) of the process path is $_{P_1}^{PF}T$, and after distribution of the motion, this relative transformation function remains $_{P_1}^{PF}T$ regardless of the percentages of distribution. This constraint can be used by the computation module 114 to solve the kinematic loop between the two manipulators 115, 117.

In some embodiments, the relative transformation function $_{P_0}^{P_1}T$ that describes the motion between two consecutive points for completing a processing task is decomposed into two components, a translation portion $_{P_0}^{P_1}P$ and a rotation portion $_{P_0}^{P_1}R$. Thus, to distribute the relative transformation $_{P_0}^{P_1}T$ that defines the process path between the holder and worker manipulators 115, 117, the translation portion $_{P_0}^{P_1}P$ and the rotation portion $_{P_0}^{P_1}R$ need to be distributed.

At step 208, the computation module 114 is configured to distribute motions between the holder and worker manipulators 115, 117 to complete the process path between points $P_0$ and $P_1$ defined by the relative transformation function. Such distribution is generally based on the weighting factor specified by the user at step 202. Because the relative transformation function can be divided into two components (i.e., translation and rotation) as described above with respect to step 206, motions can be separately distributed between the manipulators 115, 117 with respect to each of the two components in accordance with the user-specified weighting factor (e.g., 95% of translation motion accomplished by the worker manipulator and 85% of rotation motion accomplished by the holder manipulator or vice versa or some other combination). In some embodiments, the order of dividing these portions between the two manipulators 115, 117 is not important, as the translation portion can be divided before dividing the rotation portion or vice versa.

Figure 8:
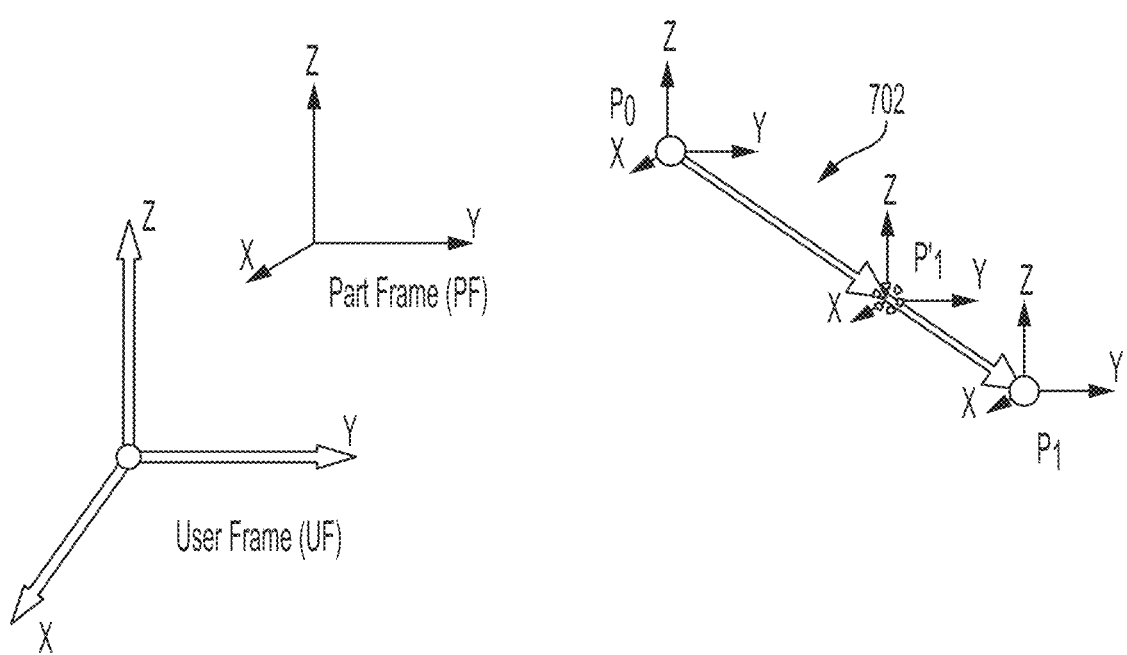
FIG. 8 graphically illustrates an exemplary distribution of the translation portion of the relative transformation function of FIG. 7 between two manipulators, according to some embodiments of the present invention.

FIG. 8 graphically illustrates an exemplary distribution of the translation portion $_{P_0}^{P_1}P$ of the relative transformation function $_{P_0}^{P_1}T$ of FIG. 7 between the manipulators 115, 117, according to some embodiments of the present invention. As shown, the translation portion 702 ($_{P_0}^{P_1}P$) of the process path from the first point $P_0$ to the next point $P_1$ needs to be completed between the pair of manipulators 115, 117 in order to perform a given task. If the worker manipulator 117 is completing all the motion, it needs to move a translation motion of $\Delta P_{01}$ from the first point $P_0$ to reach the next point $P_1$. However, a user can specify a percentage of this motion to be distributed to the worker manipulator 117, hereinafter generally referred to as the first manipulator, while the second manipulator (i.e., the holder manipulator 115) completes the remaining percentage. In other embodiments, the first manipulator is the holder manipulator 115 for which the user specifies a percentage of motion distribution, while it is assumed that the second manipulator, which is the worker manipulator 117, completes the remaining percentage. This division of labor corresponds to an intermediate point $P'_1$ between the first point $P_0$ and the next point $P_1$ along the translation path 702 for dividing motions between the first and second manipulators. As described above, the percentages of distribution can be specified by the user via the interface 110 at step 202 (e.g., via any one of the interfaces 300, 400 and 500) for one of the first or second manipulator. Thus, as shown, the first manipulator needs to move a translation motion of $\Delta P_{01'}$ from its initial location, which is the first point $P_0$, to reach the intermediate point $P'_1$, and the second manipulator needs to move a translation motion of $\Delta P_{11'}$ from its initial location complete the given task. Translation motions $\Delta P_{01'}$ and $\Delta P_{11'}$ can be computed using the following set of equations:

$$\Delta P_{01} = {}^{UF}P_1 - {}^{UF}P_0 \quad \text{(Equation 1)};$$

$$\Delta P_{01'} = w \odot \Delta P_{01} \quad \text{(Equation 2)};$$

$$^{UF}P_{1'} = {}^{UF}P_0 + \Delta P_{01'} \quad \text{(Equation 3)};$$

$$\Delta P_{11'} = {}^{UF}P_1 - {}^{UF}P_{1'} \quad \text{(Equation 4)}.$$

Equation 1 computes the overall translation motion $\Delta P_{01}$ from the first point $P_0$ to the next point $P_1$ for the entirety of the process path, which is computed with respect to the user frame. Generally, the notation "UF" for a value denotes that the value is expressed with respect to the user frame. In Equation 2, w represents the weight vector indicating how much of the overall motion $\Delta P_{01}$ needs to be completed by the first manipulator, which is element-wise multiplied with the overall motion $\Delta P_{01}$ to generate the distributed translation motion for the first manipulator. The weight vector w is determined based on the weighting factor for the first manipulator, which includes one or more percentages of distribution, specified by the user via the interface 110. For example, the weight vector w can be determined based on the percentages set by the user via features 302, 304 and 306 on the interface 300 for controlling a translation motion of the first manipulator in respective ones of x, y and z directions. Similarly, the weight vector w can be determined based on the percentages set by the user via features 402, 404 and 406 on the interface 400 for controlling a translation motion of the first manipulator in respective ones of the x, y and z directions. As another example, the weight vector w can be determined based on the single percentage set by the user via feature 502 on the interface 500 for controlling a translation motion of the first manipulator in all axes. It is noted that the embodiment of FIG. 8 corresponds to the user specifying a weighting factor for the first manipulator, and the weighting factor for the second manipulator is calculated by the computing module 105 based on the weighting factor for the first manipulator. In other embodiments, the user can specify the weighting factor for the second manipulator only. In Equation 3, $^{UF}P'_1$ represents the new point to which the first manipulator needs to move to satisfy the percentage(s) of distribution specified by the user. Equation 4 computes the distributed translation motion of the second manipulator $\Delta P_{11'}$ based on the new point $^{UF}P'_1$ to be moved to by the first manipulator.

Figure 9A:
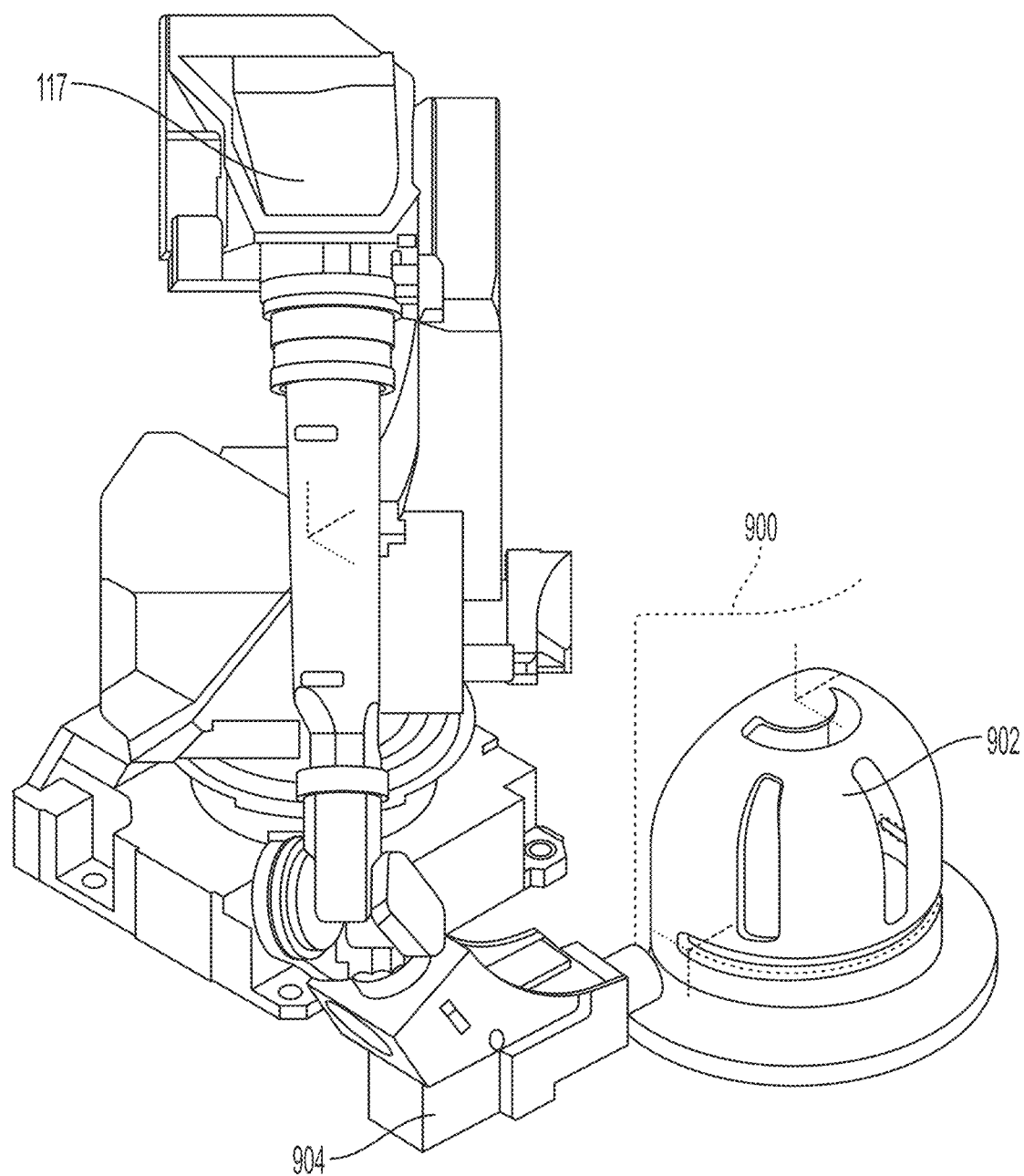
FIGS. 9a-9c show a series of snapshots capturing an exemplary rotational movement by a worker manipulator about a workpiece to perform a task on the workpiece, according to some embodiments of the present invention.
Figure 9B:
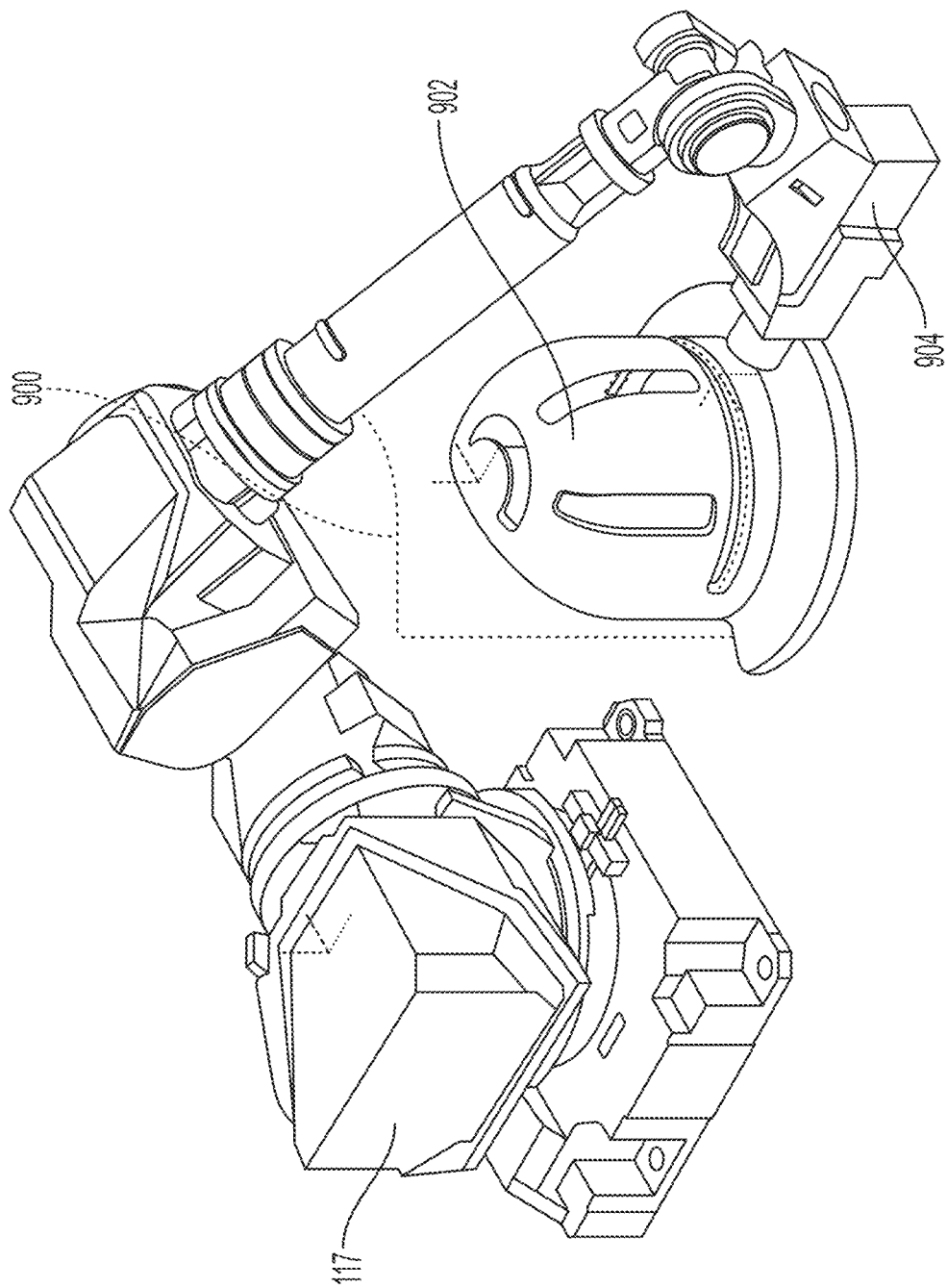
Figure 9C:
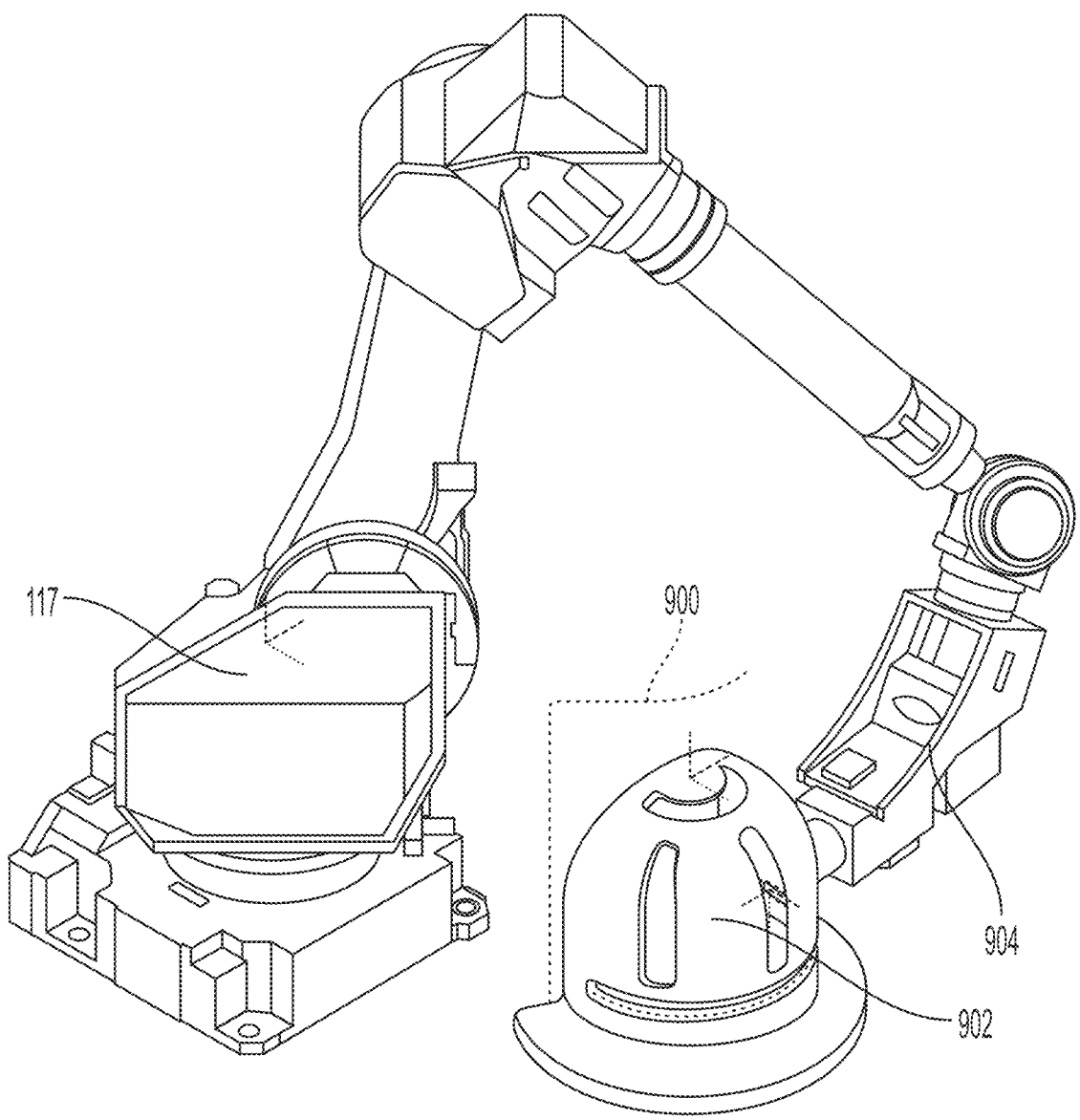
Figure 10A:
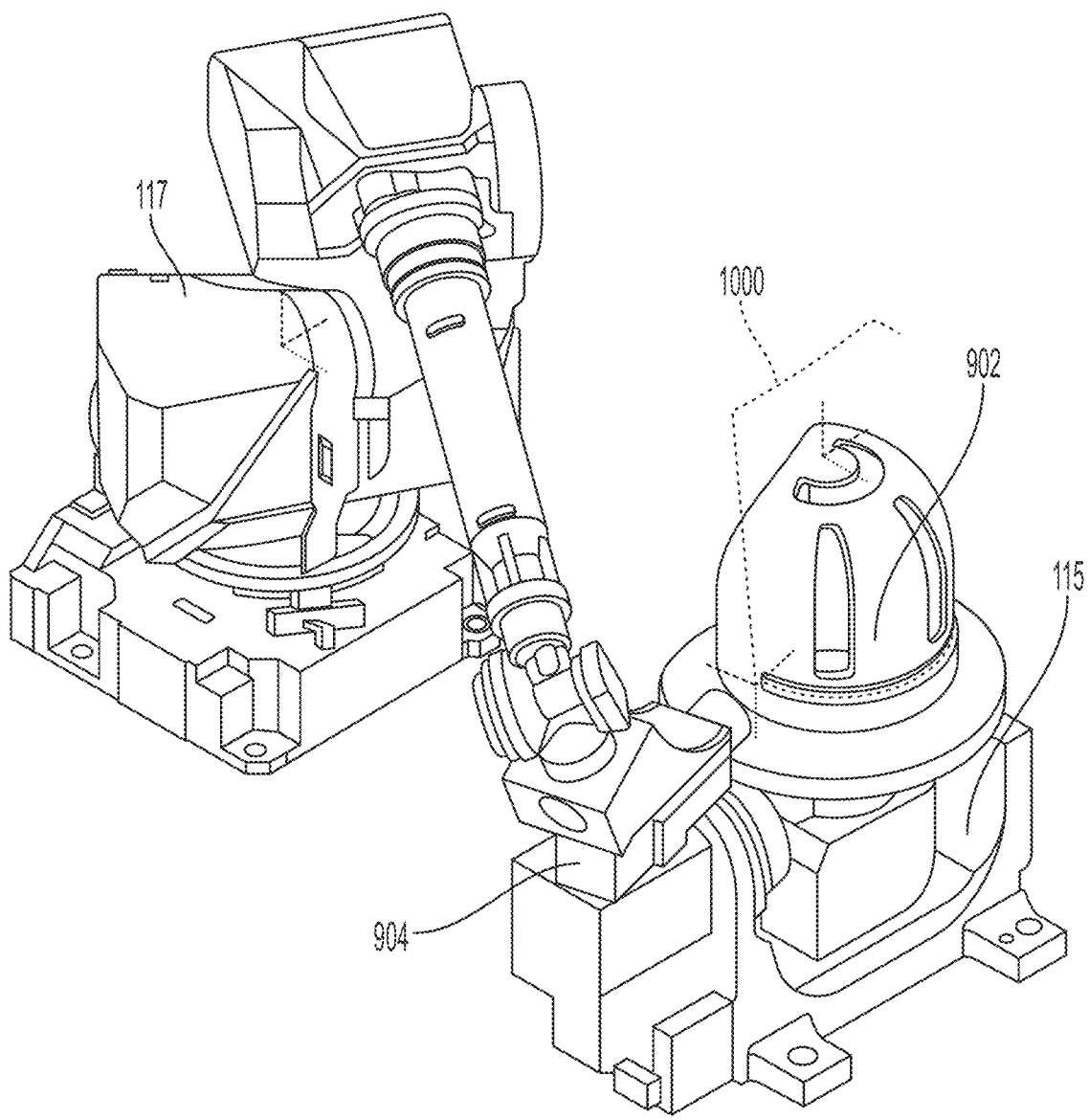
FIGS. 10a-10c show a series of snapshots capturing a rotational movement by a holder manipulator that rotates the workpiece to perform the same task of FIGS. 9a-9c, according to some embodiments of the present invention.
Figure 10B:
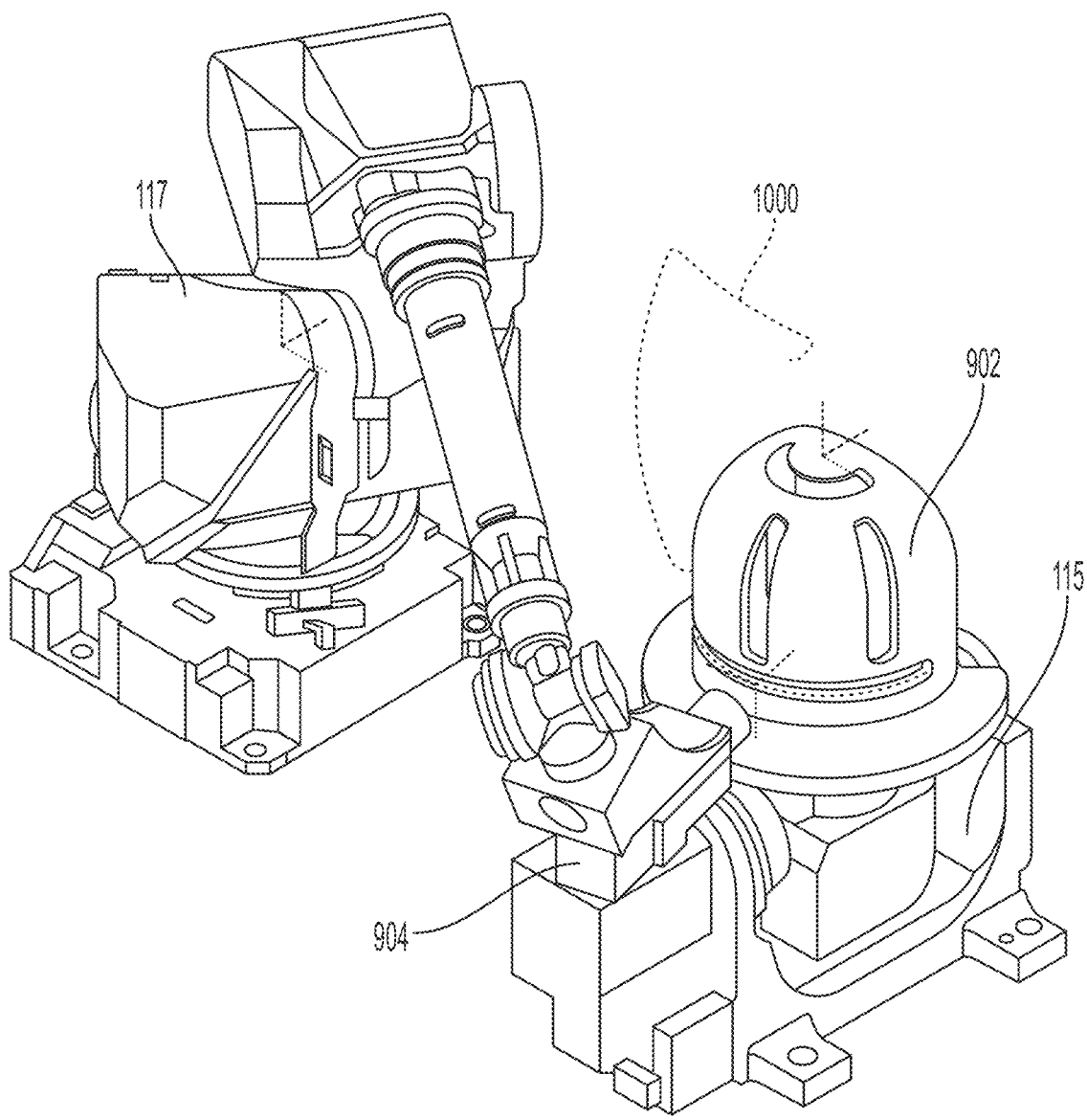
Figure 10C:
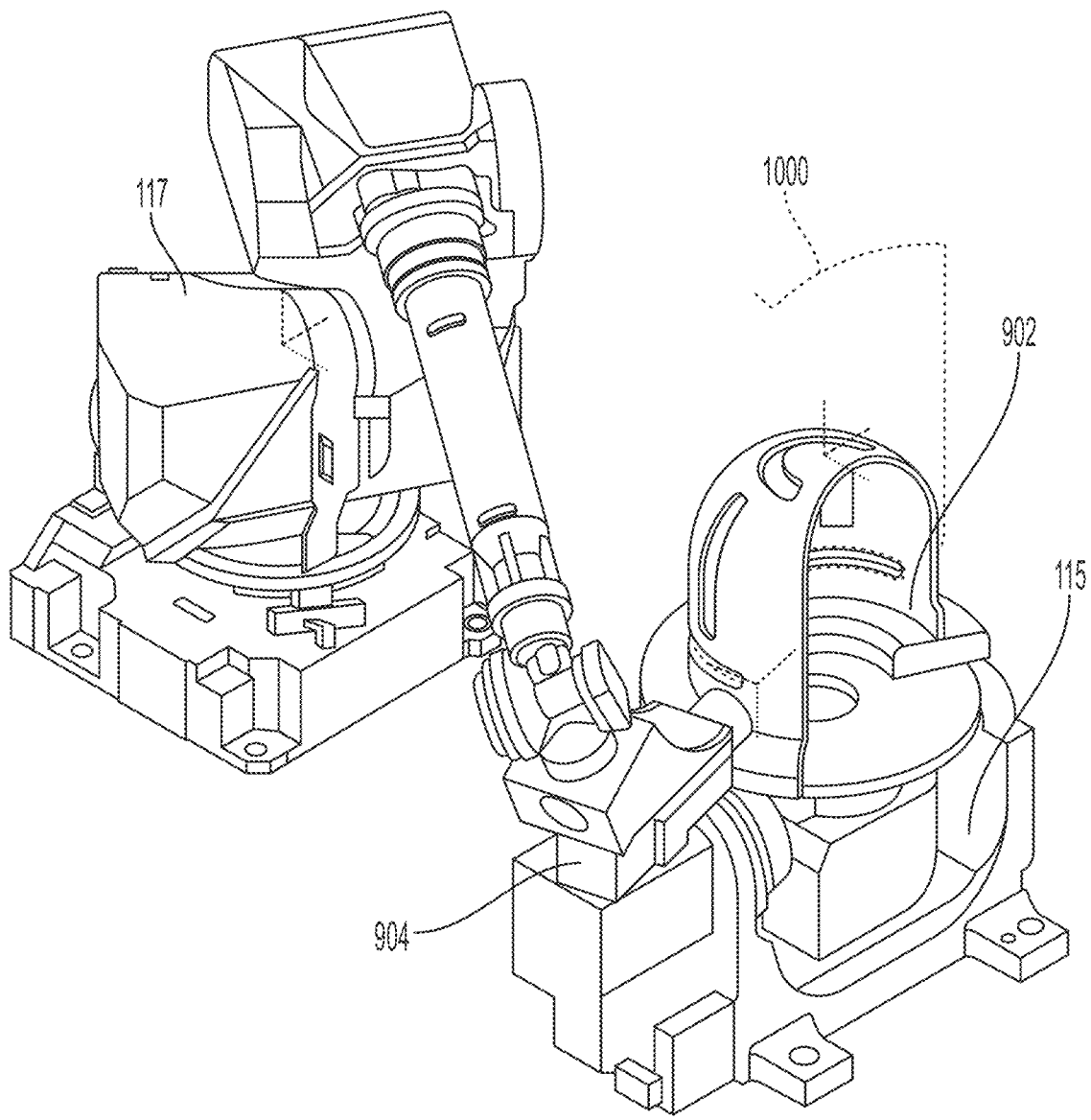

In some embodiments, the computation module 114 determines distribution of the rotation portion ${}_{P_0}^{P_1}R$ of the relative transformation function ${}_{P_0}^{P_1}T$ between the manipulators 115, 117. FIGS. 9a-9c show a series of snapshots capturing an exemplary rotational movement 900 by a worker manipulator 117 about a workpiece 902 to perform a task on the workpiece 902, according to some embodiments of the present invention. In the embodiment of FIGS. 9a-9c, the worker manipulator 117 is a robot that holds a tool 904 for processing the workpiece 902, which remains stationary in this example. FIGS. 10a-10c show a series of snapshots capturing a rotational movement 1000 by a holder manipulator 115 that rotates the workpiece 902 to perform the same task of FIGS. 9a-9c, according to some embodiments of the present invention. In the embodiment of FIGS. 10a-10c, the holder manipulator 115 is a rotary that rotates the workpiece 902 about the tool 904, which is being held stationary by the worker manipulator 117, instead of the worker manipulator 117 rotating the tool 904 around the workpiece 902 as illustrated in FIGS. 9a-9c.

In some embodiments, there are two different approaches for distributing the rotation portion ${}_{P_0}^{P_1}R$ of the relative transformation function ${}_{P_0}^{P_1}T$ between the two manipulators 115, 117, depending on the rotation-related weighting factor specified by the user via the interface 110 at step 202. The first approach is for the case where the user specifies a single percentage of distribution for dividing the rotation portion ${}_{P_0}^{P_1}R$ between the two manipulators relative to all three axes in the task space, such as via the feature 408 on the interface 400 of FIG. 5 or the feature 504 on the interface 500 of FIG. 6. In this approach, the rotation matrix ${}_{P_0}^{P_1}R$ is first converted to a rotation invariant vector ${}_{P_1}^{P_0}i$, which represents a rotation motion with a vector of rotation ($v_i$) and an angle of rotation ($\varphi_i$). Mathematically, the rotation invariant vector ${}_{P_1}^{P_0}i$ is expressed as:

$$^{P_0}_{P_2}i = \begin{bmatrix} v_i \\ \varphi_i \end{bmatrix}. \quad \text{(Equation 5)}$$

Figure 11:
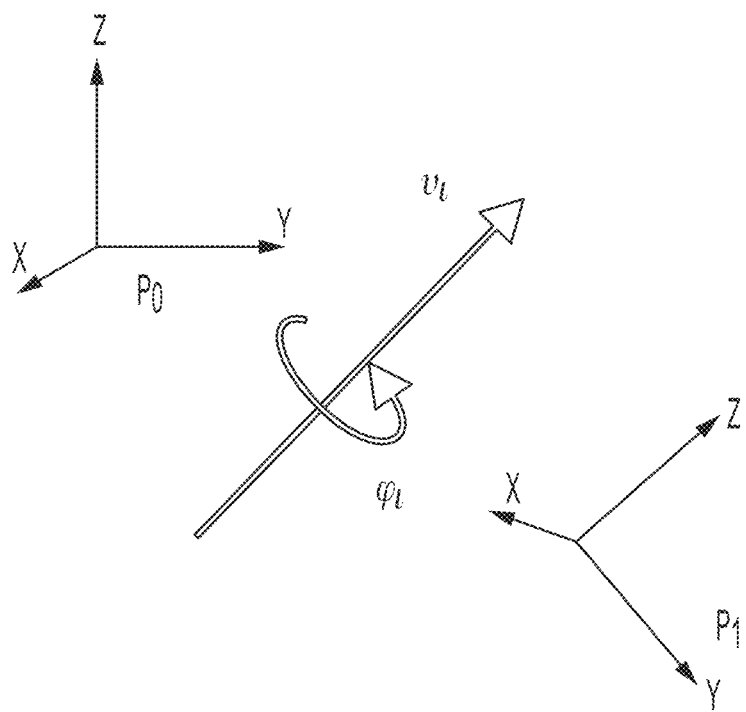
FIG. 11 graphically illustrates the rotation invariant vector generated for distributing the rotation portion of the relative transformation function between two manipulators, according to some embodiments of the present invention.

FIG. 11 graphically illustrates the rotation invariant vector ${}_{P_1}^{P_0}i$ generated for distributing the rotation portion ${}_{P_0}^{P_1}R$ of the relative transformation function ${}_{P_0}^{P_1}T$ between the two manipulators 115, 117, according to some embodiments of the present invention. When dividing the rotation portion between the two manipulators 115, 117, the vector of rotation $v_i$ remains the same for both manipulators. However, the angle of rotation $\varphi_i$ needs to be divided between the two manipulators based on the weighting factor specified by the user for one of the manipulators. For example, if the user specified the weighting factor for the worker manipulator 117, which includes a single percentage of distribution that controls the division of the rotation portion, the worker rotation angle is determined by multiplying the angle of rotation $\varphi_i$ to the percentage value. It is assumed that the remaining rotation angle is completed by the holder manipulator 115 in the opposite direction as that of the worker manipulator 117. Hence the new rotation matrices for the two manipulators can be expresses as:

$$^{P_0}_{P_1}R = {}^{UF}_{P_0}R^T {}^{UF}_{P_1}R \quad \text{(Equation 6)}$$

$$^{P_0}_{P_1}i = f_1\left({}^{P_0}_{P_1}R\right) \quad \text{(Equation 7)}$$

-continued $$_{P_2}^{P_0}i = \begin{bmatrix} v_q \\ w_r \times \varphi_q \end{bmatrix} \quad \text{(Equation 8)}$$

$$_{P_1}^{P_0}R = f_2\binom{P_0}{P_1}i \quad \text{(Equation 9)}$$

$$_{P_1}^{UF}R = _{P_0}^{UF}R_{P_1}^{P_0}R \quad \text{(Equation 10)}$$

Figure 12:
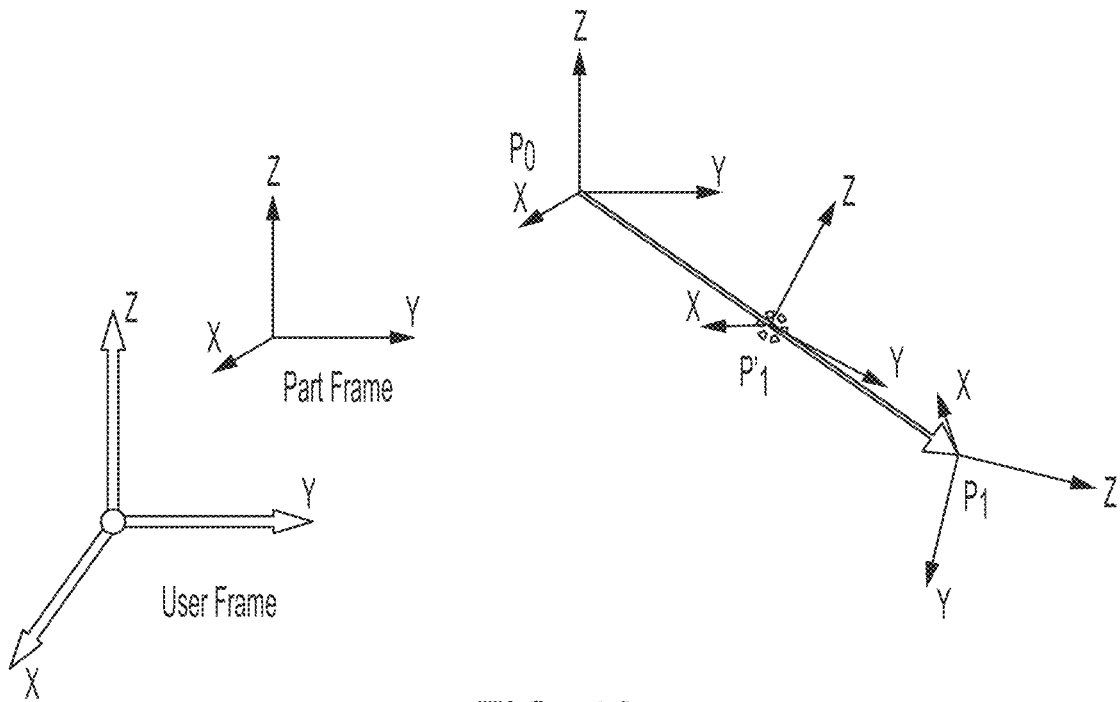
FIG. 12 graphically illustrates an exemplary distribution of the rotation portion of the relative transformation function of FIG. 7 between two manipulators based on a single percentage of distribution, according to some embodiments of the present invention.

In general, $P'_1$ represents the intermediate point for dividing the over rotation motion between the two manipulators, at which both manipulators need to reach to complete the given task. In Equation 7, $f_1$ represents the function for converting a rotation matrix to its corresponding rotation invariant vector. In Equation 8, $w_r$ is the rotation distribution weight specified by the user. Equation 8 calculates the percentage of rotation completed by the manipulator corresponding to the weight (e.g., the worker manipulator 117), where the angle of rotation is multiplied by the given distribution weight. The resulting new rotation invariant vector takes the manipulator to a mid-rotating point ($P'_1$). Equation 9 calculated a rotation matrix that takes the first point $P_0$ to the mid-rotating point $P'_1$ based on the rotation invariant vector of Equation 8. Specifically, in Equation 9, $f_2$ represents the function for converting the rotation invariant vector to its corresponding rotation matrix. Equation 10 calculates the rotation of $P'_1$ with respect to user frame. FIG. 12 graphically illustrates an exemplary distribution of the rotation portion $_{P_0}^{P_1}R$ of the relative transformation function $_{P_0}^{P_1}T$ of FIG. 7 between two manipulators 115, 117 based on a single percentage of distribution, according to some embodiments of the present invention.

Figure 13:
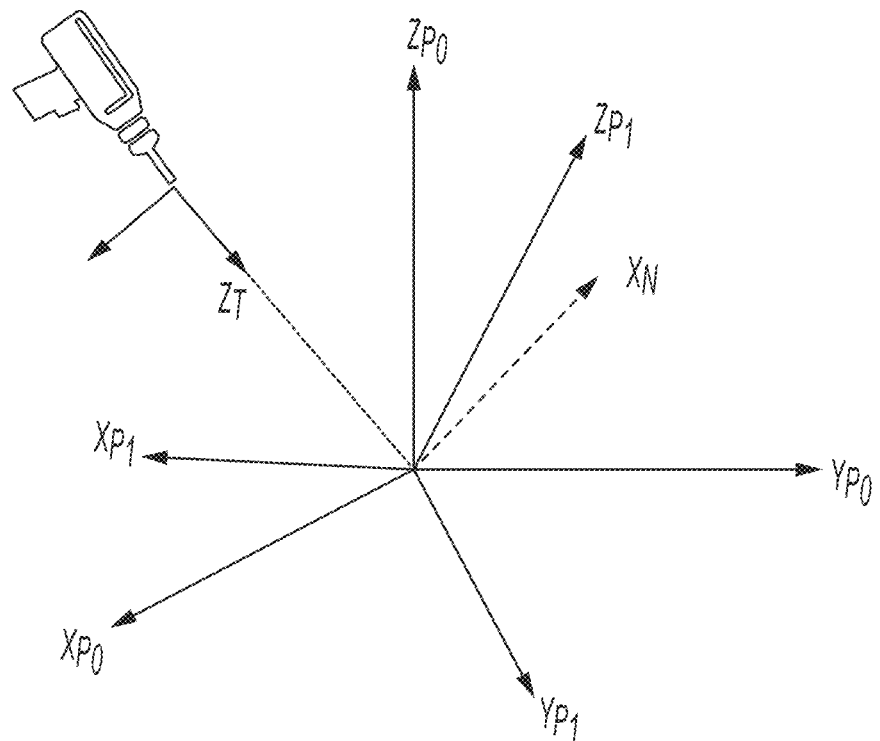
FIG. 13 illustrates an exemplary set of the main, tool and normal axes for distributing rotation between two manipulators, according to some embodiments of the present invention.

The second approach for dividing the rotation portion of the relative transformation function between two manipulators involves the case where the user specifies the main distribution axis of rotation as well as three percentages of distribution for dividing the rotation portion $_{P_0}^{P_1}R$ relative to the three axes in the task space. These percentages of distribution can be specified by the user via features 310, 312 and 314 of the interface 300 of FIG. 4, for example. If the user chooses the x-axis at point zero ($x_{P_0}$) as the main distribution axis, the other two axes are the tool axis ($Z_T$) and the normal axis ($X_N$). The tool axis $Z_T$ represents the direction of the tool that is mounted on the worker manipulator 117, and the normal axis $X_N$ represents an axis that is normal to both the main axis and the tool axis. FIG. 13 illustrates an exemplary set of the main, tool and normal axes for distributing rotation between two manipulators, according to some embodiments of the present invention. As shown, the main axis is selected by the user as the x-axis $X_{P_0}$, the tool axis is denoted $Z_T$, and the normal axis is denoted $X_N$. In FIG. 13, $Y_{P_0}$ and $Z_{P_0}$ are the Y and Z axis of a frame of the first point $P_0$ and $Y_{P_1}$ and $Z_{P_1}$ are the Y and Z axis of a frame of the next point $P_1$. In alternative embodiments, the user can choose the y-axis at point zero as the main distribution axis ($Y_{P_0}$), in which case the tool axis is denoted $Z_T$ and the normal axis is denoted $Y_N$. In alternative embodiments, the user can choose the z-axis at point zero as the main distribution axis ($Z_{P_0}$), in which case the tool axis is denoted $Z_T$ and the normal axis is denoted $Z_N$.

Figure 14:
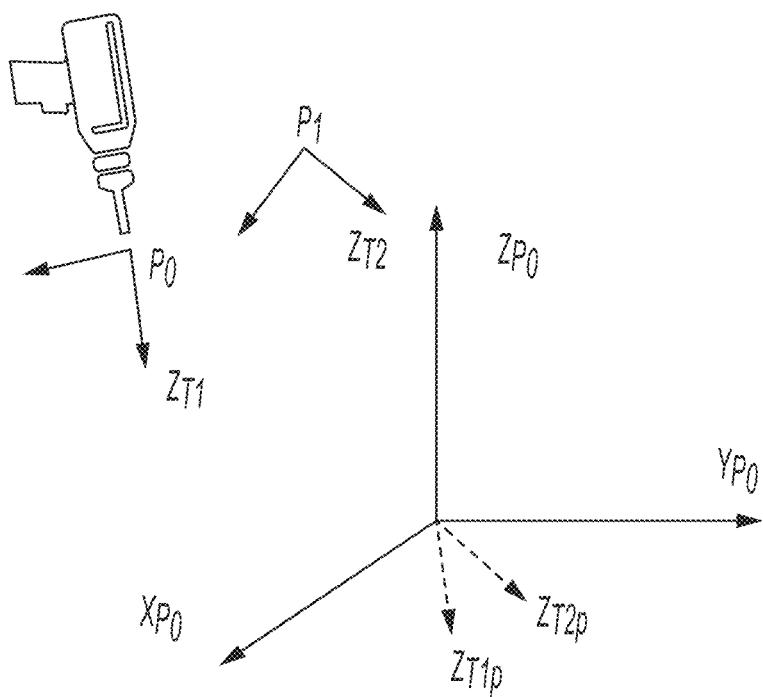
FIG. 14 graphically illustrates an exemplary task space defined by the axes of FIG. 13 for computing the rotation about the main axis, according to some embodiments of the present invention.
Figure 15:
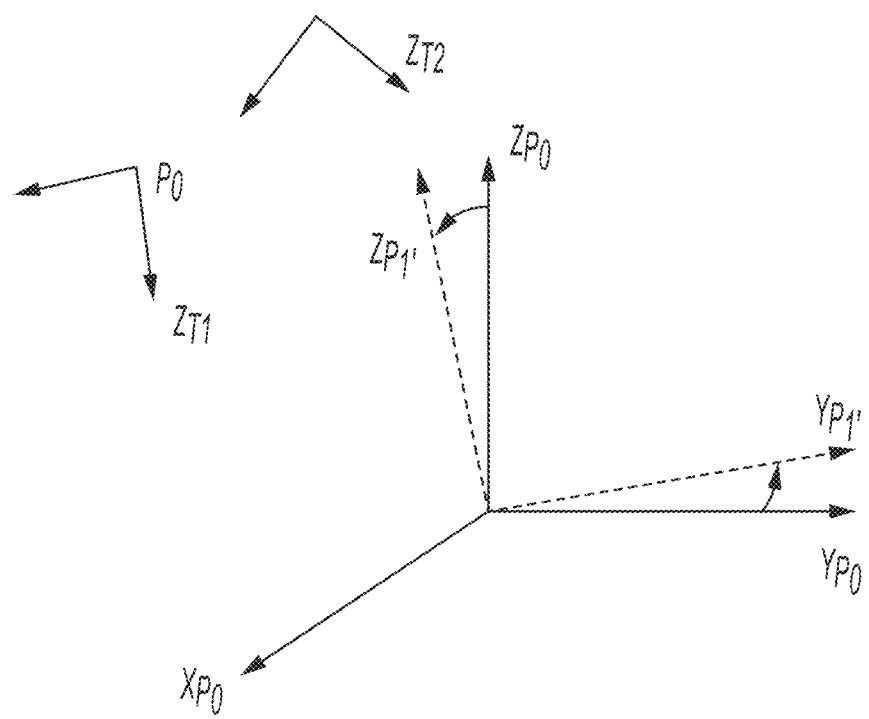
FIG. 15 graphically illustrates rotation about the main axis of FIG. 13, according to some embodiments of the present invention.

Once the three axes of rotation are determined, the computation module 114 is configured to calculate, for each of the three axes, distributed rotation motions between the two manipulators based on the percentage of distribution corresponding to the respective axis specified by the user. FIG. 14 graphically illustrates an exemplary task space defined by the axes of FIG. 13 for computing the rotation about the main axis $X_{P_n}$, according to some embodiments of the present invention. In the task space illustrated in FIG. 14, the first point of the process path is $P_0$ and the next point is $P_1$. To determine rotation around the main axis $X_{P_n}$ (and subsequently calculate the distributed rotation motions about the main axis), the $Z_{T1}$ and $Z_{T2}$ vectors related to the tool axis are projected to the plane normal to the main axis $X_{P_0}$, which results in the vectors and $Z_{T1p}$ and $Z_{T2p}$. The angle $\theta_x$ (not shown) between these two vectors is the rotation about the main axis $X_{P_0}$. To divide this angle between the two manipulators 115, 117, the percentage of distribution about the main axis for one of the manipulators (e.g., the holder manipulator 115 as specified by the user) $w_\theta$ is used, which results in a rotation angle of $w_{74}\theta_x$. Thus the rotation of the other manipulator (e.g., the worker manipulator 117) about the main axis $X_{P_0}$ is $\theta_x - w_\theta\theta_x$. FIG. 14 also illustrates the projection of the tool axis (represented by the $Z_{T1}$ and $Z_{T2}$ vectors) in the plane normal to the main axis $X_{P_0}$ to generate the set of projected vectors $Z_{T1p}$ and $Z_{T2p}$. Applying this rotation to the frame at the first point $P_0$ takes the $X_{P_n}, Y_{P_n}, Z_{P_n}$ frame to the new frame $X_{P_{1'}}, Y_{P_{1'}}, Z_{P_{1'}}$ of the new location. Generally, when a rotation occurs about an axis, such rotation does not change that axis and that axis remains the same after the rotation. FIG. 15 graphically illustrates rotation about the main axis $X_{P_0}$.

Figure 16:
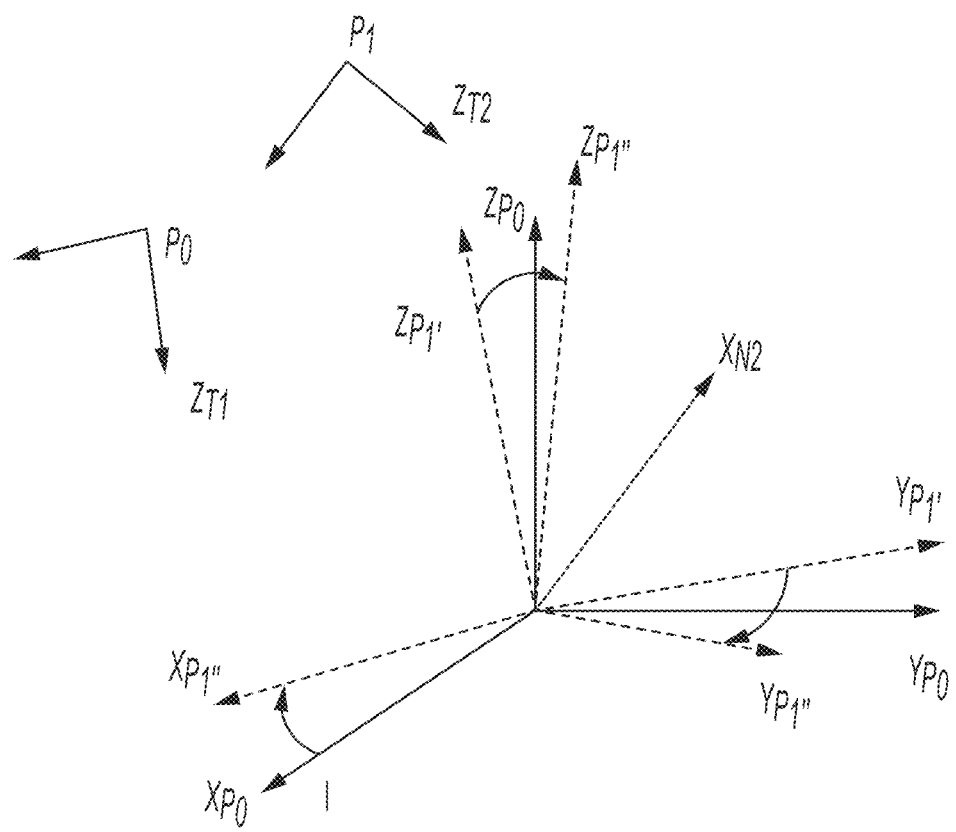
FIG. 16 graphically illustrates an exemplary task space defined by the axes of FIG. 13 for computing the rotation about the normal axis, according to some embodiments of the present invention.

The next step involves determining rotation around the normal axis $X_{N2}$, which is an axis that is normal to both the main axis $X_{P_n}$ and the tool axis $Z_{T2}$ and subsequently calculating the distributed rotation motions about the normal axis $X_{N2}$ between the two manipulators 115, 117. Again, when a rotation occurs about an axis, such rotation does not change that axis and that axis remains the same after the rotation. FIG. 16 graphically illustrates an exemplary task space defined by the axes of FIG. 13 for computing the rotation about the normal axis $X_{N2}$, according to some embodiments of the present invention. The angle of rotation about the normal axis $X_{N2}$ is equal to the difference between the angle $\varphi_1$, which is the angle between $Z_{T1}$ and $X_{P_0}$, and the angle $\varphi_2$, which is the angle between $Z_{T2}$ and $X_{P_0}$. Thus, the angle of rotation about the normal axis is $X_{N2}$ is $\Delta\varphi_{12} = \varphi_2 - \varphi_1$. The axis of rotation $X_{N2}$ can be calculated as the cross product of $X_{P_0}$ and $Z_{T2}$ vectors. To divide the angle of rotation about the normal axis between the two manipulators 115, 117, the percentage of distribution about the normal axis for one of the manipulators (e.g., the holder manipulator 115 as specified by the user) $w_\varphi$ is used, which results in a rotation angle of $w_\varphi\Delta\varphi_{12}$. Thus the rotation of the other manipulator (e.g., the worker manipulator 117) about the normal axis $X_{N2}$ is $\Delta\varphi_{12} - w_\varphi\Delta\varphi_{12}$. Applying this rotation to the frame $X_{P_{1'}}, Y_{P_{1'}}, Z_{P_{1'}}$ takes the frame to the new frame $X_{P_{2'}}, Y_{P_{2'}}, Z_{P_{2'}}$. FIG. 16 also illustrates the rotation to the new part frame $X_{P_{2''}}, Y_{P_{2''}}, Z_{P_{2''}}$.

Figure 17:
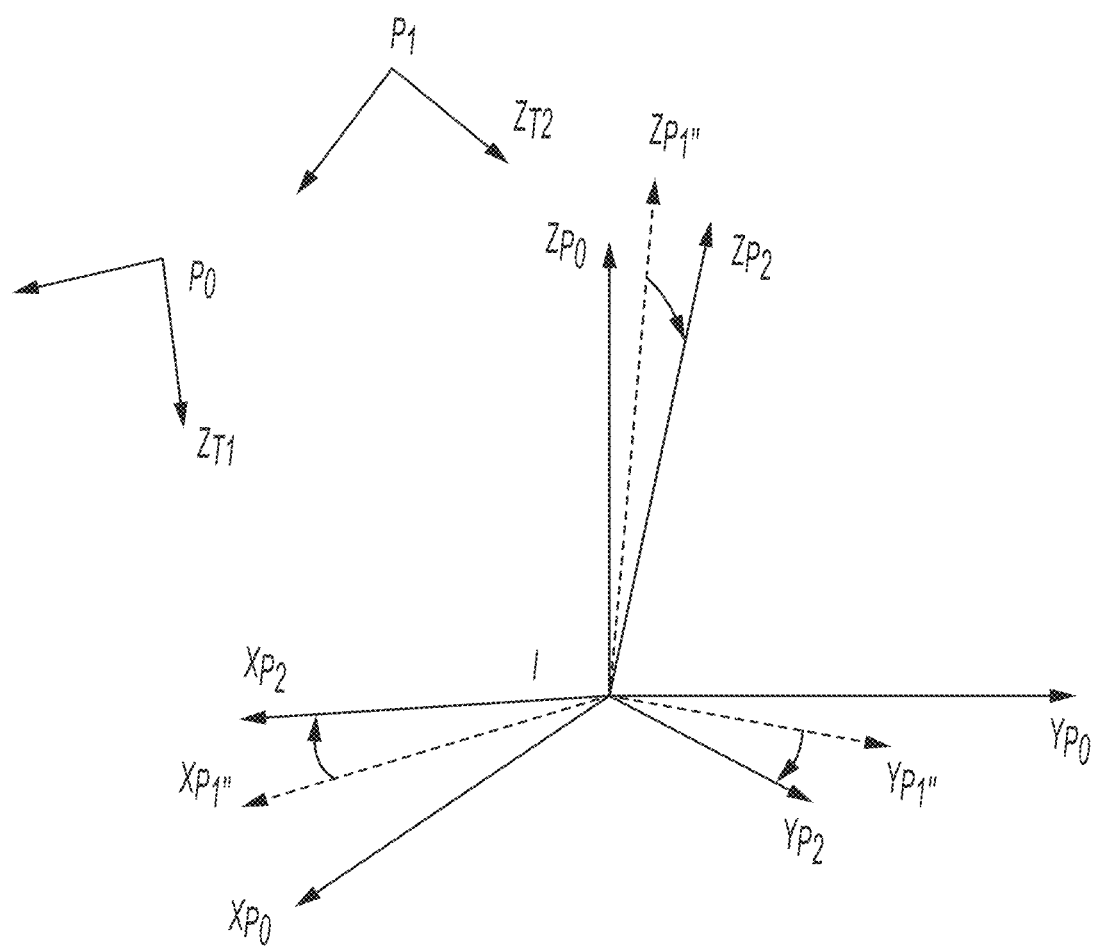
FIG. 17 graphically illustrates an exemplary task space defined by the axes of FIG. 13 for computing the rotation about the tool axis, according to some embodiments of the present invention.

The next step involves determining rotation around the tool axis $Z_{T1}$ and subsequently calculating the distributed rotation motions about the tool axis $Z_{T1}$ between the two manipulators 115, 117. FIG. 17 graphically illustrates an exemplary task space defined by the axes of FIG. 13 for computing the rotation about the tool axis $Z_{T1}$, according to some embodiments of the present invention. In some embodiments, the $Z_{T2}$ frame of $P_1$ stays aligned with $Z_{T1}$ since the rotation is about $Z_{T1}$. Therefore, the angle of rotation $\alpha_z$ is the angle between $X_{T2}$ and $X_{T1}$. To divide this angle between the two manipulators 115, 117, the percentage of distribution about the tool axis for one of the manipulators (e.g., the holder manipulator 115 as specified by the user) $w_\alpha$ is used, which results in a rotation angle of $w_\alpha\alpha_z$. Thus the rotation of the other manipulator (e.g., the worker manipulator 117) about the tool axis $X_{T1}$ is $\alpha_z - w_\alpha \alpha_z$. Applying this rotation to the frame $X_{P_2}, Y_{P_2}, Z_{P_2}$, takes the frame to the new location $X_{P_2}, Y_{P_2}, Z_{P_2}$. FIG. 17 also illustrates the rotation to the new part frame $X_{P_2}, Y_{P_2}, Z_{P_2}$.

In some embodiments, after the rotation portion of a process path is divided between the holder and worker manipulators 115, 117, the position is distributed between the manipulators. Then the distributed translation and rotation portions for each manipulator is combined to derive the process path distributed to that manipulator. For example, distribution of the translation portion of a relative transformation function is described above with respect to FIG. 8. Distribution of the rotation portion of a relative transformation using a first approach is described with respect to FIGS. 11 and 12. Distribution of the rotation portion of a relative transformation using a second approach is described with respect to FIGS. 13-17. In general, combination of the distributed translation and rotation portions for a manipulator can be calculated as follows:

$$^{UF}P'_1 = {}^{UF}P_0 + w_p \odot ({}^{UF}P_1 - {}^{UF}P_0) \quad \text{(Equation 11)}$$

$$^{UF}_{P'_1}T = \begin{bmatrix} {}^{UF}_{P'_1}R & {}^{UF}P'_1 \\ 0 & 1 \end{bmatrix} \quad \text{(Equation 12)}$$

$$^{P_1}_{P'_1}T = {}^{P_1}_{UF}T {}^{UF}_{P'_1}T \quad \text{(Equation 13)}$$

In Equation 11, $w_p$ represents the position distribution weight vector. Using the position weight factor, Equation 11 calculates the mid-position of the worker manipulator 117 as $^{UF}P'_1$. This value, in combination with the rotation matrix for the same mid-position, are put in the homogenous form $^{UF}_{P'_1}T$, as shown in Equation 12. Then the relative translation matrix of the holder manipulator 115 is computed as $^{P_1}_{P'_1}T$ using Equation 13. In some embodiments, steps 204, 206 and 208 of the approach 200 of FIG. 3 are reiterated for every consecutive first and next points along the process path until the entire process path is distributed both translationally and rotationally.

In some embodiments, the instant approach 200 is used to distribute motions between a pair of worker and holder manipulators 115, 117 in the robotic manufacturing processing system 100 to accomplish a complex processing task (e.g., cutting a workpiece). Such distribution of motions can be easily controlled by a user by, for example, adjusting one or more percentages of motion distribution associated with one of the manipulators. The user can also choose the level of control he or she wants to have over the distribution process by specifying (i) a single percentage for controlling translation distributions along the x, y and z axes, (ii) three percentages for individually controlling translation distributions along the x, y and z axes, (iii) a single percentage for controlling rotation distributions, (iv) three percentages for individually controlling rotation distributions along the main, tool and normal exes, and/or (v) a single percentage for controlling both translation and rotation. These different levels of control allow novice users and sophisticated users alike to operate the robotic manufacturing processing system 100. Further, by decomposing a complex process path to a set of decoupled motions, the approach 200 makes it easier for the user to understand the complex process and thereby capable of easily distributing the motions.

In some embodiments, the instant approach 200 insures minimum robot movements for the user-specified distribution values. Specifically, the instant approach 200 can distribute motions between the holder and worker manipulators 115, 117 to satisfy the user-specified distribution criteria without increasing the overall motions in the task space. In some embodiments, the calculated motions for the manipulators 115, 117 ensure reduced and/or minimal movements of the tool and the workpiece in the task space.

FIG. 18 shows an exemplary system setup for implementing the motion distribution approach 200 described above with respect to FIG. 3, according to some embodiments of the present invention. As shown, the holder manipulator 115 is configured to hold a plate-shaped workpiece 1402 while the worker manipulator 117, which holds the tool 1406, is configured to perform a milling operation on the workpiece 1402. The task is to mill along the path 1404 illustrated relative to the workpiece 1402.

Figures 19, 20:
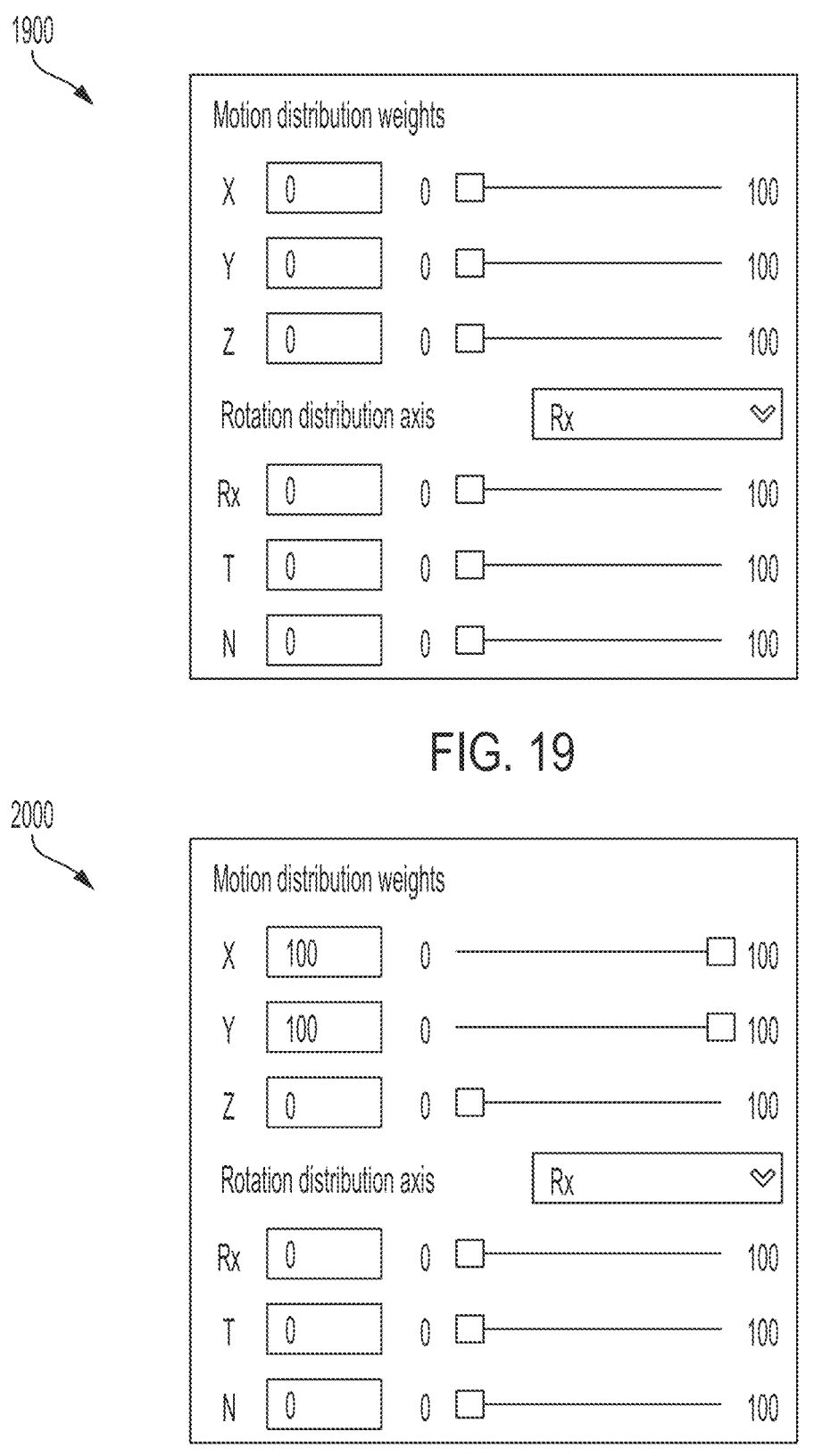

FIG. 19 shows an exemplary interface 1900 through which a user specifies a weighting factor for the holder manipulator 115 of the system setup of FIG. 18, according to some embodiments of the present invention. As shown, for the holder manipulator 115, the user sets the percentages of distribution for both translation and rotation portions of movement to zero. The approach 200 thus distributes no motion to the holder manipulator 115, thereby keeping the workpiece 1402 stationery, while assigning the entire path 1404 to the worker manipulator 117 for performing the whole task.

FIG. 20 shows another exemplary interface 2000 through which a user specifies a weighting factor for the holder manipulator 115 of the system setup of FIG. 18, according to some embodiments of the present invention. As shown, the user sets the percentages of distribution for the translation portion in the x and y directions to 100 for the holder manipulator 115. This means that the approach 200 assigns the holder manipulator 115 100% of the translation motions along the x and y directions, while assigning 100% of the translation motion along the z direction to the worker manipulator 117. In addition, the worker manipulator 117 is also assigned 100% of the rotation motion for the path 1404 along all of the rotational axes.

Figures 21, 22:
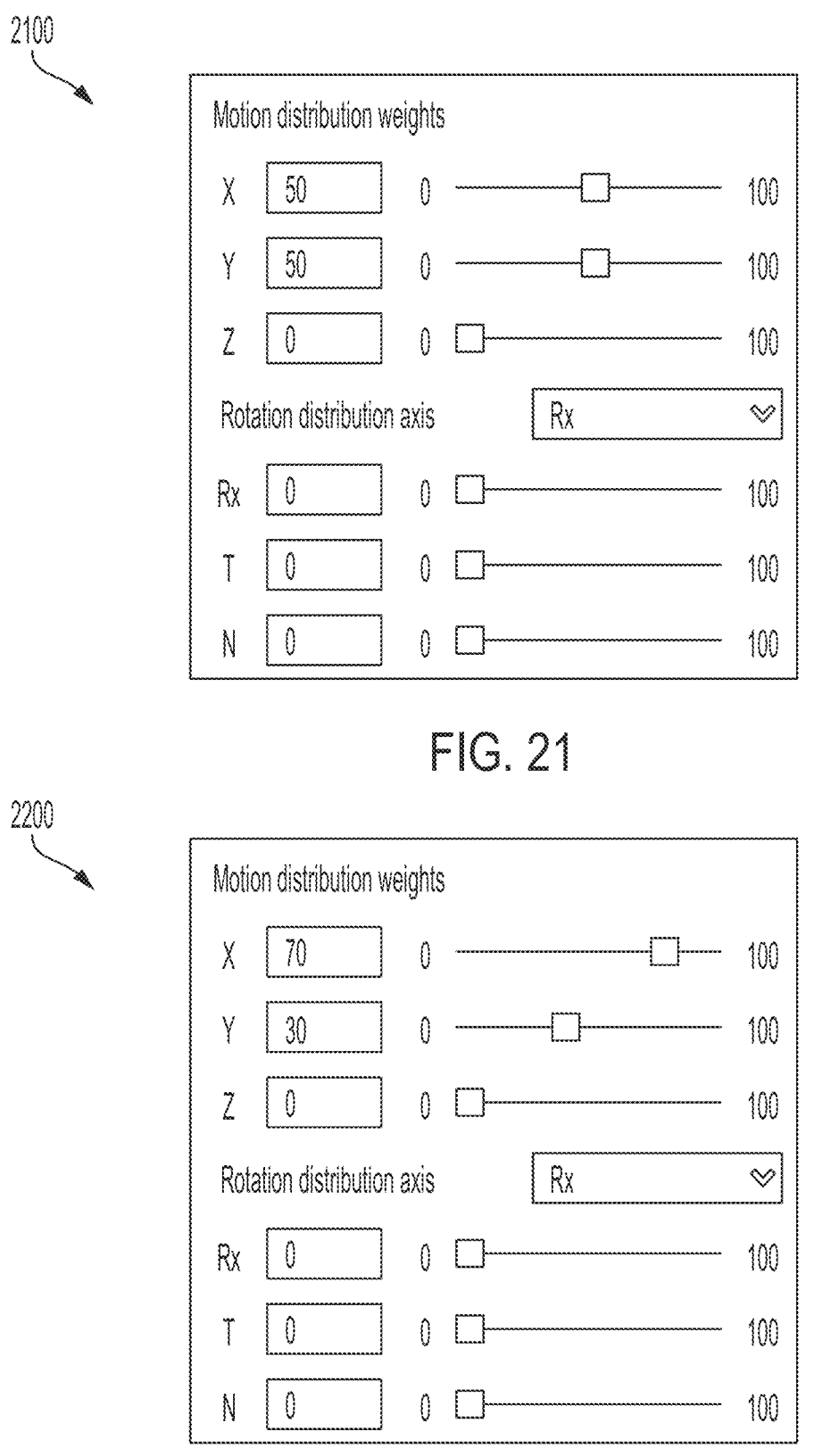

FIG. 21 shows yet another exemplary interface 2100 through which a user specifies a weighting factor for the holder manipulator 115 of the system setup of FIG. 18, according to some embodiments of the present invention. As shown, the user distributes the task evenly in the x and y directions of the translation portion between the holder and worker manipulators 115, 117 by setting the percentages of distribution to 50 in these two directions for the holder manipulator 115. For the motion in the z direction of the translation portion, since the percentage is set to 0 for the holder manipulators 115, the approach 200 assigns 100% of the motion along the z direction for the translation portion to the worker manipulator 117. Again, the worker manipulator 117 is assigned 100% of the rotation motion for the path 1404 along all of the rotational axes.

FIG. 22 shows yet another exemplary interface 2200 through which a user specifies a weighting factor for the holder manipulator 115 of the system setup of FIG. 18, according to some embodiments of the present invention. As shown, the user sets the percentage of distribution in the x direction for the translation portion to 70 and in the y direction for the translation portion to 30 for the holder manipulator 115. This results in a translation motion split between the holder and worker manipulators 115, 117 such that the worker manipulator 117 performs 30% of the translation motion in the x direction and 70% of the translation motion in the y direction.

In general, the interfaces 1900, 2000, 2100 and 2200 have substantially the same configuration as the interface 300 of FIG. 4, which is described above in detail. For example, each of these interfaces have three sliders and/or text boxes for specifying the percentages of distribution in relation to translation along the x, y and z axes of the user frame. Each interface also has three sliders and/or text boxes for specifying the percentages of distribution in relation to rotation about the main axis (Rx, Ry or Rz), tool axis (T) and normal axis (N) of the user frame. Further, each interface allows the user to select the main axis of rotation (e.g., Rx, Ry or Rz) via a drop-down box. These interfaces illustrate that motion in any one of x, y, z, main, tool and normal dimensions can be distributed based on any user-given ratio between the holder and worker manipulators 11, 117. These interfaces also illustrate that motions can be quickly distributed based on user settings to generate a workable solution that satisfies user criteria. Thus, the instant approach is simple, quick and practical in an industrial setting. Further, these interfaces illustrate that the end user can control the robotic movements by indicating how the task can be shared along each dimension/direction, instead of focusing on how each manipulator moves.

Figure 23:
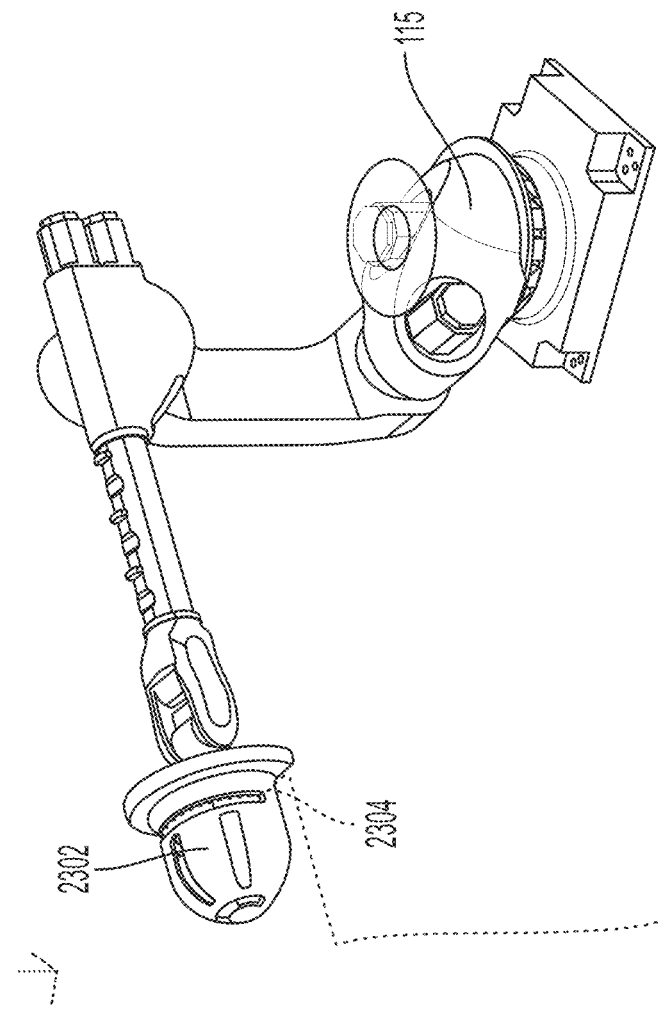
FIG. 23 shows another exemplary system setup for implementing the motion distribution approach of FIG. 3, according to some embodiments of the present invention.
Figure 23:
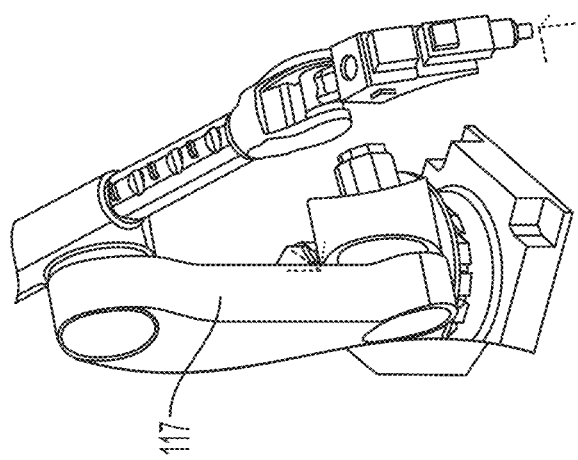

FIG. 23 shows another exemplary system setup for implementing the motion distribution approach 200 described above with respect to FIG. 3, according to some embodiments of the present invention. As shown, the holder manipulator 115 is configured to hold a dome-shaped workpiece 2302 while the worker manipulator 117 is configured to perform a machining operation on the workpiece 2302. The task is to machine along the path 2304 illustrated in the task space.

Figures 24, 25:
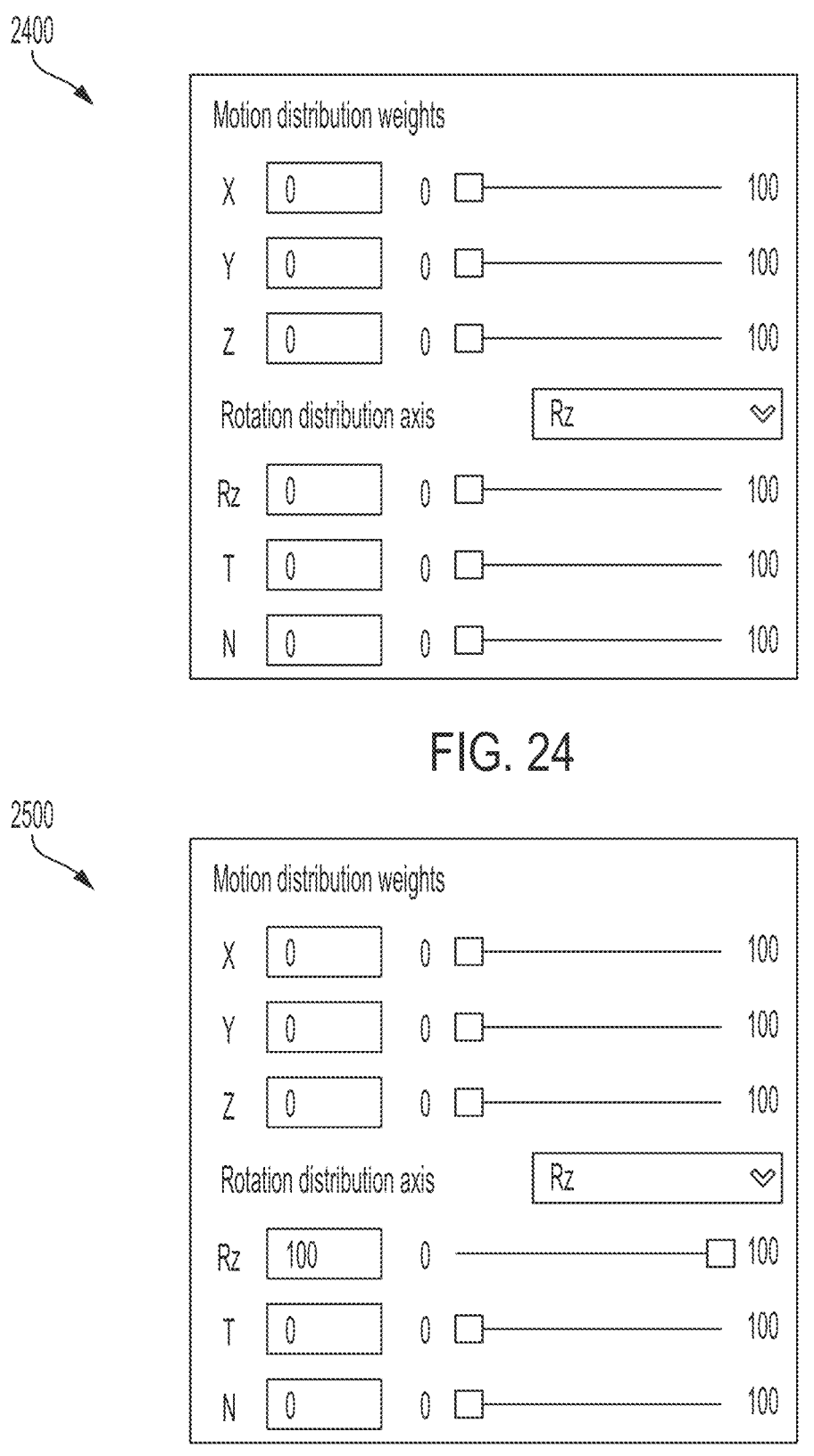

FIG. 24 shows an exemplary interface 2400 through which a user specifies a weighting factor for the holder manipulator 115 of the system setup of FIG. 23, according to some embodiments of the present invention. As shown, for the holder manipulator 115, the user sets the percentages of distribution in all dimensions of movements to zero. The approach 200 thus distributes no motion to the holder manipulator 115, thereby keeping the workpiece 2302 stationery, while assigning the entire path 2304 to the worker manipulator 117 for performing the whole task. Therefore, the worker manipulator 117 needs to move the tool that is mounted thereon around the workpiece 2302, which involves large joint motions by the worker manipulator 117.

FIG. 25 shows another exemplary interface 2500 through which a user specifies a weighting factor for the holder manipulator 115 of the system setup of FIG. 23, according to some embodiments of the present invention. As shown, for the holder manipulator 115, the user selects the z-axis as the main axis and sets the percentage of distribution for the rotation portion about the main axis to 100. The approach 200 thus distributes all of the rotation motion about the z-axis to the holder manipulator 115 while assigning no rotation motion to the worker manipulator 117 about the same axis. By allowing the user to assign this rotation motion to the holder manipulator 115, the task is now shared between the manipulators, thus is simplified for the worker manipulator 117, including reducing the joint motions for the worker manipulator 117, in comparison to the case of FIG. 24 where the worker manipulator 117 completes the entire task. In the embodiment of FIG. 25, the worker manipulator 117 still performs all the translation portion of the process path 2304, as well as the rotation portion about the tool and normal axes.

Figure 26:
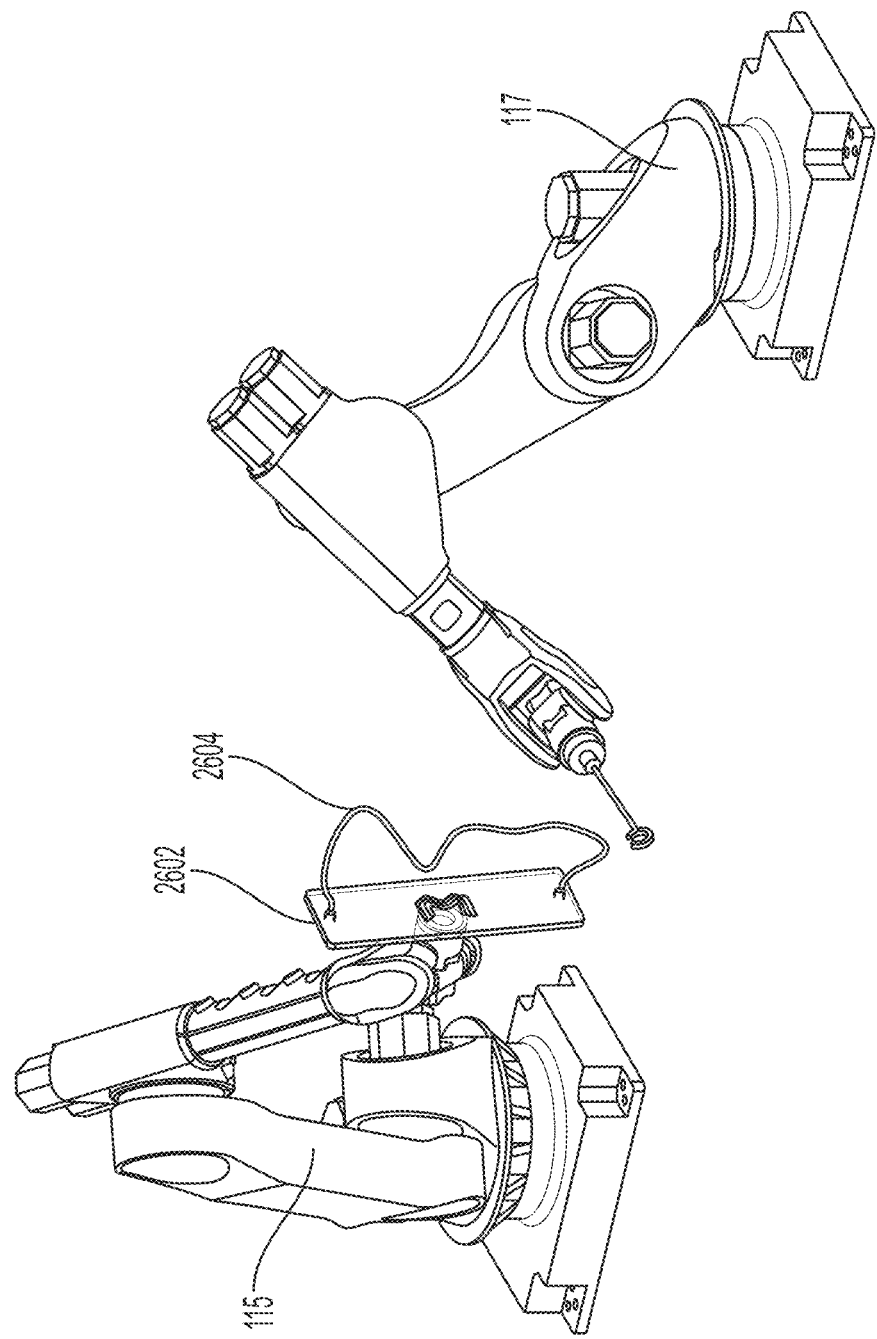
FIG. 26 shows yet another exemplary system setup for implementing the motion distribution approach described above with respect to FIG. 3, according to some embodiments of the present invention.

FIG. 26 shows yet another exemplary system setup for implementing the motion distribution approach 200 described above with respect to FIG. 3, according to some embodiments of the present invention. The task to be shared by the manipulators 115, 117 in this setup is to pass the loop 2602 held by the worker manipulator 117 through the wire 2604 held by the holder manipulator 115.

Figures 27, 28:
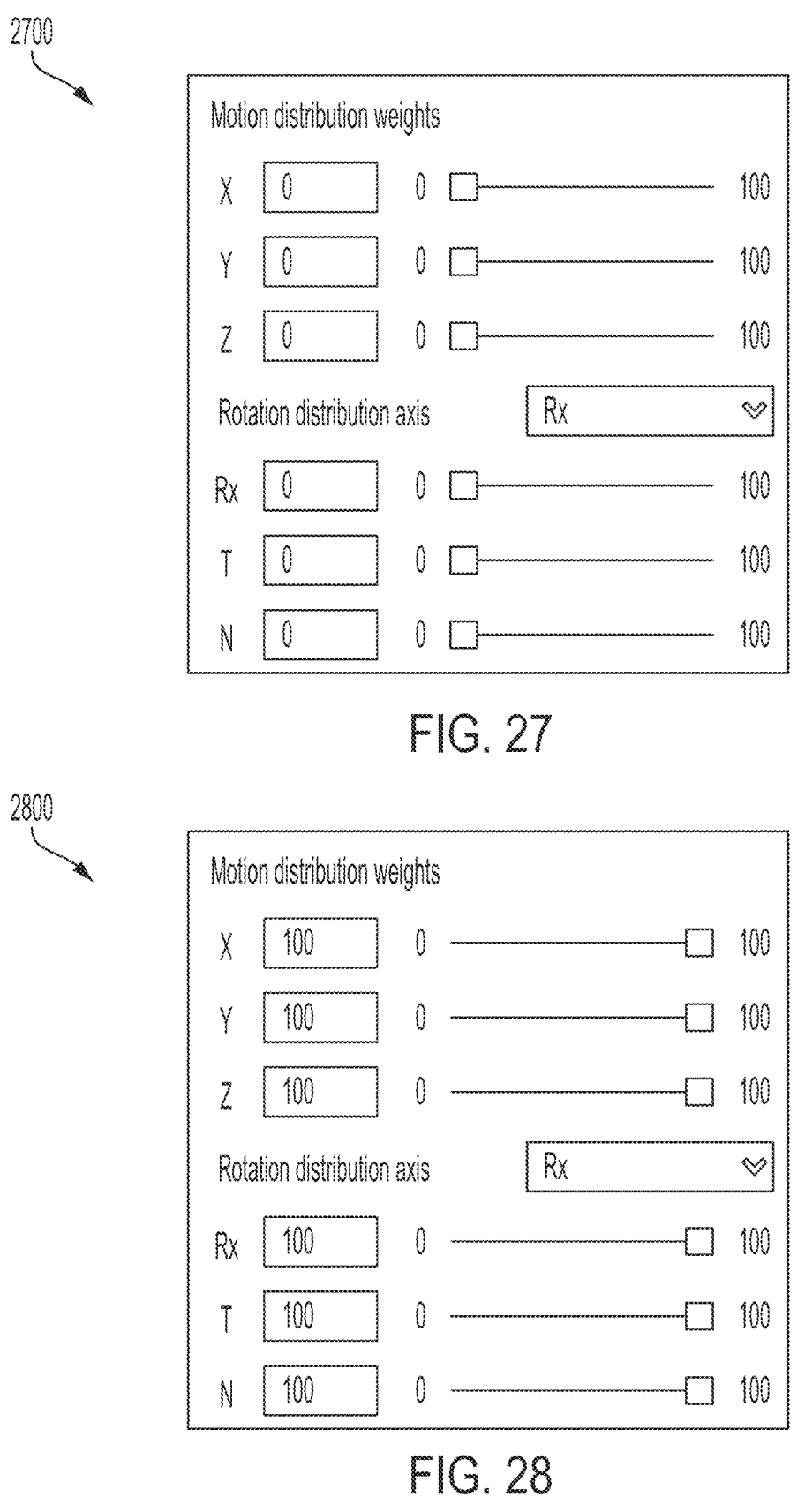

FIG. 27 shows an exemplary interface 2700 through which a user specifies a weighting factor for the holder manipulator 115 of the system setup of FIG. 26, according to some embodiments of the present invention. As shown, for the holder manipulator 115, the user sets the percentages of distribution in all dimensions of movements to zero. The approach 200 thus distributes no motion to the holder manipulator 115, thereby keeping the wire 2604 stationery, while assigning all the motions to the worker manipulator 117 to pass the loop 2602 along the wire 2604. This requires the worker manipulator 117 to move through a series of abrupt joint motions to be able to pass the loop 2602 along the wire 2604.

Alternatively, FIG. 28 shows another exemplary interface 2800 through which a user specifies a weighting factor for the holder manipulator 115 of the system setup of FIG. 26, according to some embodiments of the present invention. As shown, for the holder manipulator 115, the user sets the percentages of distribution for translation and rotation in all dimensions to 100. The approach 200 thus distributes no motion to the worker manipulator 117, thereby keeping the loop 2602 stationary, while assigning all the motions to the holder manipulator 115 to pass the wire 2604 through the loop 2602. This reversal of task assignment reduces the overall joint motions and enables the task to be completed more efficiently in comparison to the case corresponding to FIG. 27.

Figure 29:
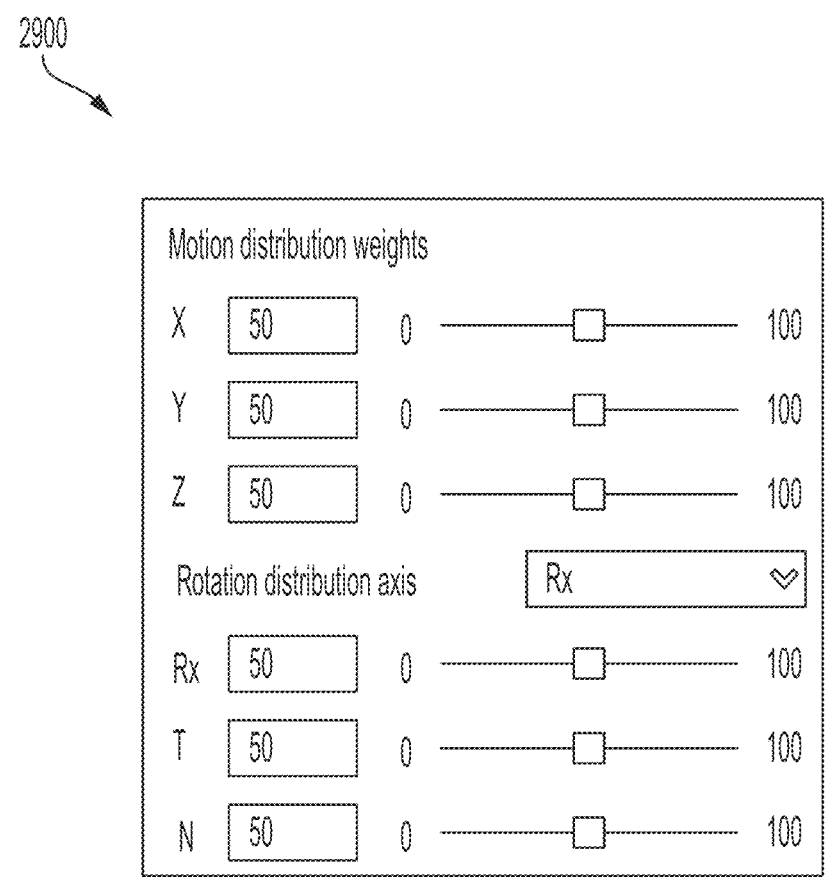

Alternatively, FIG. 29 shows yet another exemplary interface 2900 through which a user specifies a weighting factor for the holder manipulator 115 of the system setup of FIG. 26, according to some embodiments of the present invention. As shown, the user is able to evenly distribute the motions in all dimensions/directions for both translation and rotation portions between the holder and worker manipulators 115, 117. This creates a better balance in the joint motions for both of the manipulators in comparison to the case of FIG. 28.

In general, the present invention offers a computationally faster and more efficient robotic path planning tool for redundancy resolution than the tools on the market today. The user can interact with various interface features (e.g., set sliders) to graphically adjust the path criteria to drive the path determination process. Thus, the present invention can quickly resolve motion redundancies between two manipulators via user-friendly workflows. By allowing the user to set the desired parameters for motion distribution, the present invention reduces programming effort while increasing user control.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A computer-implemented method for adjustably distributing cooperative motion between a first manipulator and a second manipulator in a manufacturing processing system, the computer-implemented method comprising:

receiving, by a computing device, data for the first manipulator configured to hold a tool, data for the second manipulator configured to hold a workpiece, and process data defining a process to be performed by the tool on at least a portion of the workpiece, wherein the data for at least one of the first or second manipulator comprises a weighting factor adjustable by a user to specify at least a percentage of motion for the corresponding manipulator;

calculating, by the computing device, a first point and a next point in a process path by the tool over the workpiece using the process data;

generating, by the computing device, a relative transformation function for defining at least one of a translation portion or a rotation portion of the process path from the first point to the next point; and distributing, by the computing device, motions between the first and second manipulators to complete the process path based on the at least one weighting factor, wherein distributing the motions comprises distributing the at least one translation or rotation portion between the first and second manipulators in accordance with the percentage of motion corresponding to each manipulator specified by the respective weighting factor.

2. The computer-implemented method of claim 1, further comprising actuating the first and second manipulators in accordance with the calculated motions for the respective manipulators.

3. The computer-implemented method of claim 1, wherein distributing the motions between the first and second manipulators comprises distributing each of the translation portion and the rotation portion between the first and second manipulators in accordance with the weighting factor.

4. The computer-implemented method of claim 3, wherein distributing the translation portion between the first and second manipulators comprises:

defining a weight vector based on the weighting factor, the weight vector representing a relative motion in each of X, Y and Z directions for the manipulator corresponding to the weighting factor;

element-wise multiplying the weight vector with the translation portion to generate a distributed translation motion for the corresponding manipulator; and generating a distributed translation motion for the other manipulator based on the distributed translation motion for the corresponding manipulator.

5. The computer-implemented method of claim 3, wherein the weighting factor includes a single weight for controlling complete rotation of the manipulator corresponding to the weighting factor.

6. The computer-implemented method of claim 5, wherein distributing the rotation portion between the first and second manipulators comprises:

generating a rotation matrix based on the single weight;
converting the rotation matrix to an invariant vector that is represented by a vector of rotation and an angle of rotation; and distributing the angle of rotation between the first and second manipulators based on the single weight to generate distributed rotation motions for the first and second manipulators.

7. The computer-implemented method of claim 3, wherein the weighting factor comprises multiple weights for controlling rotation in multiple axes for the manipulator corresponding to the weighting factor.

8. The computer-implemented method of claim 7, wherein distributing the rotation portion between the first and second manipulators comprises:

determining a main axis, a tool axis and a third axis that is normal to both the main axis and the tool axis; and for each of the main, tool and third axes, calculating distributed rotation motions between the first and second manipulators based on the weight corresponding to the respective axis.

9. The computer-implemented method of claim 1, wherein the weighting factor comprises a plurality of user-selected percentages for controlling distributions for translation and rotation along the process path.

10. The computer-implemented method of claim 9, wherein the plurality of percentages comprise three percentages for controlling corresponding translational distributions along x, y and z axes.

11. The computer-implemented method of claim 9, wherein the plurality of percentages comprise a single percentage for controlling translational distributions along x, y and z axes.

12. The computer-implemented method of claim 9, wherein the plurality of percentages comprise three percentages for controlling corresponding rotational distributions along a user-selected main axis, a tool axis, and a third axis normal to both the main and tool axes.

13. The computer-implemented method of claim 9, wherein the plurality of percentages comprise a single percentage for controlling rotational distributions along all three of a user-selected main axis, a tool axis, and a third axis normal to both the main and tool axes.

14. The computer-implemented method of claim 1, wherein the weighting factor comprises a single user-selected percentage for controlling distributions for both translation and rotation along the process path.

15. The computer-implemented method of claim 1, wherein the calculated motions for the first and second manipulators ensures minimal movements of the tool and the workpiece in the task space.

16. The computer-implemented method of claim 1, wherein the weighting factor relates to the percentage of motion for one of the first or second manipulator and wherein the computer device is adapted to compute a percentage of motion for the other manipulator based on the weight factor.

17. A computer system configured to allow a user to adjustably distribute cooperative motion between a first manipulator and a second manipulator in a manufacturing processing system, the computer system comprising:

a data connection and graphical user interface configured to receive from the user (i) data for the first manipulator configured to hold a tool, (ii) data for the second manipulator configured to hold a workpiece, and (iii) process data defining a process to be performed by the tool on at least a portion of the workpiece, wherein the data for at least one of the first or second manipulator comprises a weighting factor adjustable by the user from the interface to specify at least a percentage of motion for the corresponding manipulator;

a computation module configured to:
    calculate a first point and a next point of a process path by the tool over the workpiece using the process data;
    generate a relative transformation function for defining at least one of a translation portion or a rotation portion of the process path from the first point to the next point; and
    distribute motions between the first and second manipulators to complete the process path based on the at least one weighting factor, wherein distribute the motions comprises distribute the at least one translation or rotation portion between the first and second manipulators in accordance with the percentage of motion corresponding to each manipulator specified by the respective weighting factor; and
a display module configured to graphically illustrate the distributed motions for respective ones of the first and second manipulators for visualizing processing of the workpiece held by the second manipulator by the tool held by the first manipulator.

18. The computer system of claim 17, further comprising an actuation module in electrical communication with the computation module for actuating the first and second manipulators in accordance with the calculated motions for the respective manipulators.

19. The computer system of claim 17, wherein distribute the motions between the first and second manipulators comprises distribute each of the translation portion and the rotation portion of motion between the first and second manipulators in accordance with the weighting factor.

20. The computer system of claim 19, wherein the weighting factor comprises a single weight value for controlling rotation of the corresponding manipulator in all axes.

21. The computer system of claim 19, wherein the weighting factor comprises a plurality of weight values for controlling rotation of the corresponding manipulator in respective ones of a plurality of axes comprising a user-selected main axis, a tool axis and a third axis normal to both the main and tool axes.

22. The computer system of claim 19, wherein the weight factor comprises a single weight value for controlling translation of the corresponding manipulator in all axes.

23. The computer system of claim 19, wherein the weight factor comprises a plurality of weight values for controlling translation of the corresponding manipulator in respective ones of a plurality of axes comprising an x-axis, a y-axis, and a z-axis.

24. The computer system of claim 19, wherein the weight factor comprises a single weight value for controlling both translation and rotation of the corresponding manipulator in all axes.

25. A computer-implemented method for adjustably distributing cooperative motion between a first manipulator and a second manipulator in a manufacturing processing system, the computer-implemented method comprising:
    receiving, by a computing device, data for the first manipulator configured to hold a tool, data for the second manipulator configured to hold a workpiece, and process data defining a process to be performed by the tool on at least a portion of the workpiece, wherein the data for at least one of the first or second manipulator comprises a weighting factor adjustable by a user to specify at least one percentage of motion to be performed by the corresponding manipulator;
    calculating, by the computing device, a first point and a next point of a process path by the tool over the workpiece using the process data;
    generating, by the computing device, a relative transformation function for defining the process path from the first point to the next point, the relative transformation function comprising a translation portion and a rotation portion;
    distributing, by the computing device, the translation portion of the relative transformation function between the first and second manipulators based on the weighting factor to generate distributed translation motions for the first and second manipulators; and
    distributing, by the computing device, the rotational portion of the relative transformation function between the first and second manipulators based on the weighting factor to generate distributed rotation motions for the first and second manipulators.

26. The computer-implemented method of claim 25, wherein the weighting factor includes a first set of one or more percentages of motion specifying translation of one of the first or second manipulator.

27. The computer-implemented method of claim 26, wherein distributing the translation portion of the relative transformation function between the first and second manipulators comprises:
    defining a weight vector based on the first set of one or more percentages of motion, the weight vector representing a relative motion in each of X, Y and Z directions for the one of the first or second manipulator;
    element-wise multiplying the weight vector with the translation portion to generate the distributed translation motion for the one of the first or second manipulator; and
    generating the distributed translation motion for the other manipulator based on the distributed translation motion for the one manipulator.

28. The computer-implemented method of claim 26, wherein the weighting factor further includes a second set of one or more percentages of motion for controlling rotation of one of the first or second manipulator.

29. The computer-implemented method of claim 28, wherein the second set of one or more percentages of motion comprises a single percentage that specifies a degree of rotation of the one of the first or second manipulator in all axes.

30. The computer-implemented method of claim 28, wherein distributing the rotation portion of the relative transformation function between the first and second manipulators comprises:
    generating a rotation matrix based on the single percentage;
    converting the rotation matrix to an invariant vector that is represented by a vector of rotation and an angle of rotation; and
    distributing the angle of rotation between the first and second manipulators based on the single percentage to generate the distributed rotation motions for the first and second manipulators.

31. The computer-implemented method of claim 28, wherein the second set of one or more percentages of motion comprises a plurality of percentages that specify degrees of rotation of the one of the first or second manipulator in multiple axes.

32. The computer-implemented method of claim 31, wherein distributing the rotation portion of the relative transformation function between the first and second manipulators comprises:
- determining a main axis, a tool axis and a third axis that is normal to both the main axis and the tool axis; and
- for each of the main, tool and third axes, calculating distributed rotation motions between the first and second manipulators based on the percentage corresponding to the respective axis.

33. The computer-implemented method of claim 25, wherein the weighting factor includes a single percentage of motion that specifies both translation and rotation of one of the first or second manipulator.

34. The computer-implemented method of claim 25, further comprising displaying the distributed translation and rotation motions for respective ones of the first and second manipulators for visualizing processing of the workpiece by the tool.

35. A computer program product, tangibly embodied in a non-transitory computer readable storage device, for adjustably distributing cooperative motion between a first manipulator and a second manipulator in a manufacturing processing system, the computer program product including instructions operable to cause a computing device to:
- receive data for the first manipulator configured to hold a tool, data for the second manipulator configured to hold a workpiece, and process data defining a process to be performed by the tool on at least a portion of the workpiece, wherein the data for at least one of the first or second manipulator comprises a weighting factor adjustable by a user to specify at least a percentage of motion for the corresponding manipulator;
- calculate a first point and a next point of a process path by the tool over the workpiece using the process data;
- generate a relative transformation function for defining at least one of a translation portion or a rotation portion of the process path from the first point to the next point; and
- distribute motions between the first and second manipulators to complete the process path based on the at least one weighting factor, wherein the instructions operable to cause the computing device to distribute motions comprises instructions operable to cause the computing device to distribute the at least one translation or rotation portion between the first and second manipulators in accordance with the percentage of motion corresponding to each manipulator specified by the respective weighting factor.

* * * * *

UNITED STATES PATENT AND TRADEMARK OFFICE
CERTIFICATE OF CORRECTION

PATENT NO. : 11,413,751 B2
APPLICATION NO. : 16/787418
DATED : August 16, 2022
INVENTOR(S) : Mohammad Keshmiri et al.

It is certified that error appears in the above-identified patent and that said Letters Patent is hereby corrected as shown below:

In the Specification

Column 14, Lines 36-41:

$$^{P_0}_{P_2}i = \begin{bmatrix} v_i \\ \varphi_i \end{bmatrix}. \qquad \text{(Equation 5)}$$

Should read:

$$^{P_0}_{P_1}i = \begin{bmatrix} v_i \\ \varphi_i \end{bmatrix} \qquad \text{(Equation 5)}.$$

Column 15, Lines 1-4:

$$^{P_0}_{P_2}i = \begin{bmatrix} v_q \\ w_r \times \varphi_q \end{bmatrix} \qquad \text{(Equation 8)}$$

Should read:

$$^{P_0}_{P'_1}i = \begin{bmatrix} v_q \\ w_r \times \varphi_q \end{bmatrix} \qquad \text{(Equation 8)}$$

Column 16, Line 15:
is used, which results in a rotation angle of $w_{74}\theta_x$. Thus the
Should read:
is used, which results in a rotation angle of $w_\theta \theta_x$. Thus the Column 16, Line 51:
to the frame $X_{P_{2'}} Y_{P_{2'}} Z_{P_{2'}}$ takes the frame to the new frame
Should read:
to the frame $X_{P_{1'}} Y_{P_{1'}} Z_{P_{1'}}$ takes the frame to the new frame Signed and Sealed this
Sixteenth Day of July, 2024

Katherine Kelly Vidal
*Director of the United States Patent and Trademark Office*

CERTIFICATE OF CORRECTION (continued)
U.S. Pat. No. 11,413,751 B2

Column 16, Line 52:

$X_{P_2"} Y_{P_2"} Z_{P_2"}$. FIG. 16 also illustrates the rotation to the new
Should read:
$X_{P_1"} Y_{P_1"} Z_{P_1"}$. FIG. 16 also illustrates the rotation to the new Column 16, Line 53:

part frame $X_{P_2"} Y_{P_2"} Z_{P_2"}$.
Should read:
part frame $X_{P_1"} Y_{P_1"} Z_{P_1"}$.

Column 17, Line 3:

rotation to the frame $X_{P_2"} Y_{P_2"} Z_{P_2"}$ takes the frame to the new
Should read:
rotation to the frame $X_{P_1"} Y_{P_1"} Z_{P_1"}$ takes the frame to the new